United States Patent [19]

Sato et al.

[11] Patent Number: 4,568,177
[45] Date of Patent: Feb. 4, 1986

[54] AUTOMATIC ORIGINAL HANDLING APPARATUS

[75] Inventors: Tadashi Sato, Kokubunji; Katsushi Furuichi, Yokohama; Toshio Honma, Tokyo; Katsumi Murakami, Kawasaki, all of Japan

[73] Assignee: Canon Kabushiki Kaisha, Tokyo, Japan

[21] Appl. No.: 579,649

[22] Filed: Feb. 13, 1984

Related U.S. Application Data

[63] Continuation of Ser. No. 418,030, Sep. 14, 1982, abandoned, which is a continuation of Ser. No. 167,345, Jul. 10, 1980, abandoned, which is a continuation of Ser. No. 914,907, Jun. 12, 1978, abandoned.

[30] Foreign Application Priority Data

Jun. 24, 1977 [JP] Japan ................................. 52-75042

[51] Int. Cl.⁴ ............................................. G03B 27/52
[52] U.S. Cl. ................................... 355/40; 355/14 C; 355/50
[58] Field of Search ............ 355/40, 41, 14 C, 14 SH, 355/50, 51

[56] References Cited

U.S. PATENT DOCUMENTS

| | | | |
|---|---|---|---|
| 3,288,025 | 11/1966 | Litz et al. | 355/41 |
| 4,099,860 | 7/1978 | Connin | 355/14 C |
| 4,126,390 | 11/1978 | Connin | 355/14 C |
| 4,227,798 | 10/1980 | Steiner | 355/14 C |
| 4,314,754 | 2/1982 | Shimizu et al. | 355/14 C |

Primary Examiner—Richard A. Wintercorn
Attorney, Agent, or Firm—Fitzpatrick, Cella, Harper & Scinto

[57] ABSTRACT

An automatic original handling apparatus provided with an original supporting mechanism for supporting an original thereon and a mechanism for determining image forming conditions for said original and adapted for performing an image forming operation on said original according to thus determined image forming conditions, said apparatus featured in being capable of interrupting the image forming operation on said original and performing an image forming operation on an another original.

17 Claims, 29 Drawing Figures

FIG. 3
FIG. 4
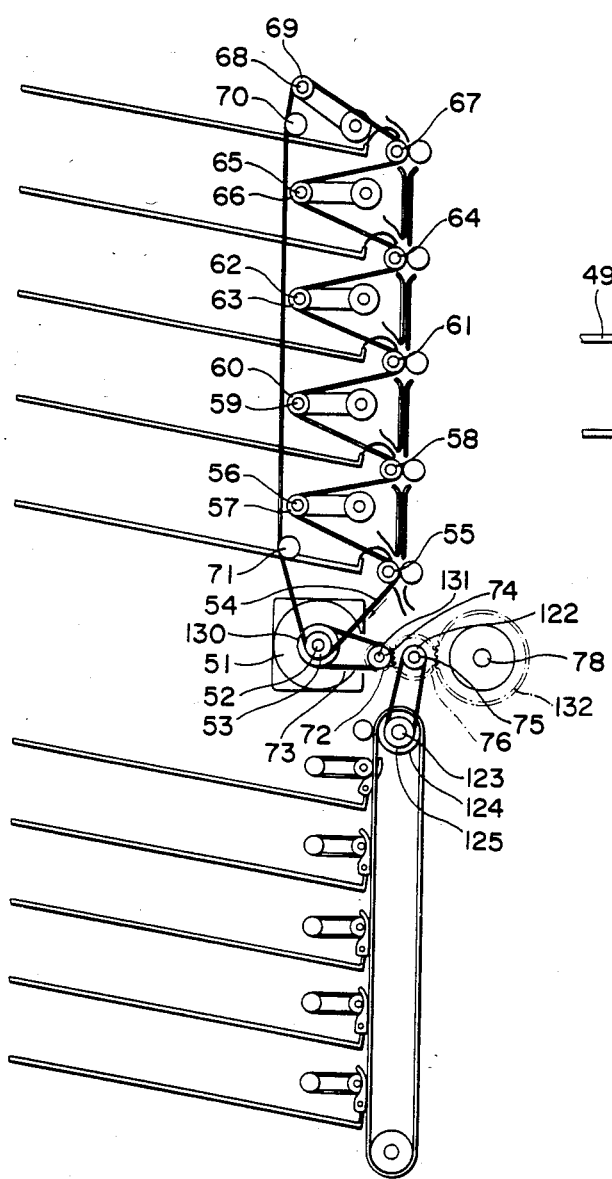
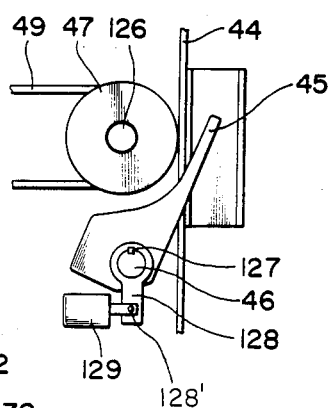

FIG. 9B

| LINE\COR | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | WR(0) | | WA(0) | | WR(1) | | WA(1) | | WR(2) | | WA(2) | | WR(3) | | WA(3) | |
| 1 | WR(4) | COPY COUNTER WA(4) | | WR(5) | | WA(5) | | WR(6) | | WA(6) | | WR(7) | | WA(7) | | |
| 2 | 1ST | 2ND | 3RD | 4TH | 5TH ORIGINAL CARRYING BIN NO | | | | | | | | | | | |
| 3 | 1ST STAGE SETTING NO | | 2ND STAGE | | 3RD STAGE | | 4TH STAGE | | 5TH STAGE | | | | | | | |
| 4 | NUMBER SET FLAG | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

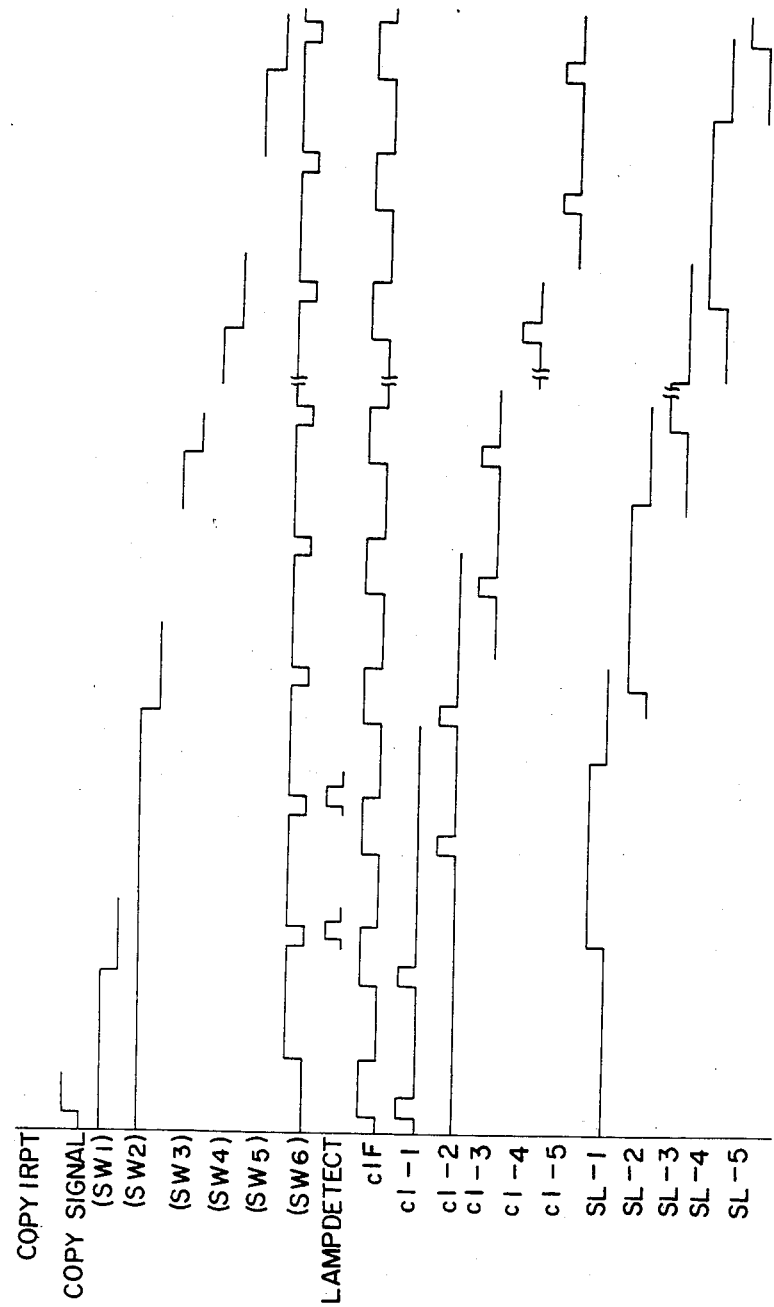

AUTOMATIC ORIGINAL HANDLING APPARATUS

This is a continuation of application Ser. No. 418,030, filed Sept. 14, 1982, which is a continuation of Ser. No. 167,345, filed July 10, 1980, which in turn is a continuation of Ser. No. 914,907, filed June 12, 1978, all now abandoned.

BACKGROUND OF THE INVENTION

1. Field of the Invention

The present invention relates to an automatic original handling apparatus adapted for use in an image forming apparatus for forming an image from an original, for example a copier.

2. Description of the Prior Art

In the prior art apparatus there are provided plural bins for accommodating originals to be copied, each of said bins being provided with a feeding means for feeding said originals which are transported through a common path to an original exposure section wherein an image formation required for copying is conducted with an exposure means such as an optical scanning means, and then are returned to original receiving bins corresponding to the aforementioned original accommodating bins. In such apparatus the copying operation is started when a first user places originals into an original bin and provides instructions by means of a setting cevice for the necessary copying conditions, such as the number of copies. Even during the course of said copying process, a second or subsequent user may place originals into other bins and provide instructions for relevant copying conditions such as the number of copies, on the corresponding setting devices, whereby the copying process for the second user can be automatically started as soon as the process for the first user is completed.

Such conventional apparatus is disadvantageous in that, if some of the original bins already contain originals to be copied, the copying of a new original, even if it is required urgently, must wait until the copying of originals already in the bins is completed.

SUMMARY OF THE INVENTION

An object of the present invention, therefore, is to provide an automatic original handling apparatus allowing prompt copying even when the first user process is not completed.

Another object of the present invention is to provide an automatic original handling apparatus as aforementioned utilizing digital control.

Another object of the present invention is to provide an automatic original handling apparatus as aforementioned utilizing a microprocessor.

Another object of the present invention is to provide an automatic original handling apparatus provided with a mechanism for displacing an original placed in a predetermined position in the image formation section when the image formation from said original is interrupted.

Another object of the present invention is to provide an automatic original handling apparatus provided with a means for indicating the state of the apparatus after the interruption of image formation from an original and indicating when the image formation from an another original becomes possible.

Another object of the present invention is to provide an automatic original handling apparatus provided with a mechanism for temporarily retracting an original upon interruption of an image forming operation thereon and subsequently restarting the image forming operation thereon.

Another object of the present invention is to provide an automatic original handling apparatus capable of identifying the termination of interruption of an image forming operation on an original and restarting the image forming operation on said original.

Still other objects of the present invention will be made apparent in the description of the embodiments of the present invention, with particular reference to the attached drawings.

BRIEF DESCRIPTION OF THE DRAWINGS

FIG. 3 is a cross-sectional view of the drive part thereof;

FIG. 4 is an enlarged cross-sectional view of the original receiving section thereof;

FIG. 9B is an explanatory drawing of the interior of the random memory;

FIG. 28 is an explanatory drawing of external timings.

DETAILED DESCRIPTION OF THE PREFERRED EMBODIMENTS

Figure 1:
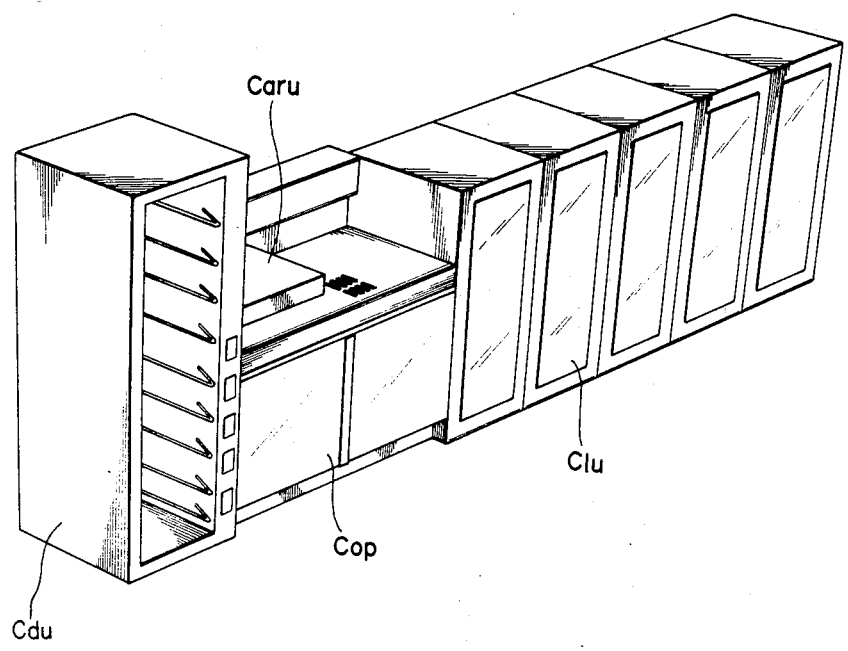
FIG. 1 is a perspective view of the automatic original handling apparatus of the present invention.

FIG. 1 is a perspective view of the automatic original handling apparatus of the present invention showing a copy demand unit CDU for placing the originals to be copied, a copier COP of which an original carriage receives said originals from said copy demand unit CDU through a carrying unit Caru, and a copy classifying unit Clu in which the copies are classified and placed in a corresponding position to the originals placed in said demand unit CDU.

Figure 2:
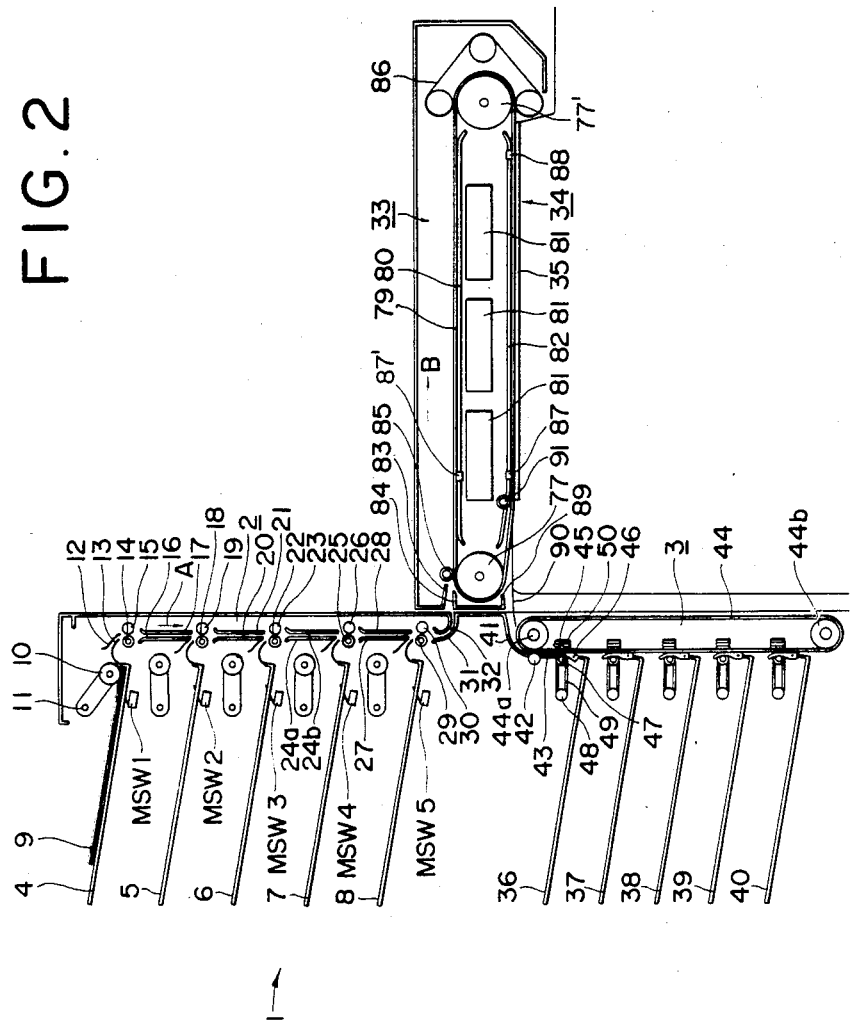
FIG. 2 is a cross-sectional view of the automatic original handling apparatus of the present invention.

FIG. 2 shows a cross-sectional view of the abovementioned copy demand unit CDU and carrying unit Caru wherein the numeral 1 indicates the copy demand unit shown in FIG. 1 which consists of an original stock section 2 and an original receiving section 3.

Said original stock section 2 is provided with plural original stock bins 4, 5, 6, 7, 8 for placing the originals to be copied.

Upon placing originals 9 on the original stock bin 4, a microswitch MSW1 for detecting the presence of an original is actuated to enable indication of the number of copies to be made from said originals 9 placed on said bin 4 on a copy counter (to be explained later) by means of a copy selector provided, for example on the copier, according to an electric sequence control to be explained later.

The actuation of said detecting microswitch MSW1 causes a pick-up roller 10 to be lowered by rotation around an axis 11 onto an uppermost original 9, thus enabling the transportation of original 9. The rotation of said axis 11, which is connected with said pick-up roller, for example, by a belt (not shown), causes the advancement of originals 9 sheet by sheet from the top of the stack placed on said stock bin 4 when the axis 11 is driven by appropriate signals, and said originals 9 are thus transported in the direction of arrow A through guide plates 12, 13, a drive roller 14, a roller 15, guide plates 16, 17, a drive roller 18, a roller 19, guide plates 20, 21, a drive roller 22, a roller 23, guide plates 24a, 24b, a drive roller 25, a roller 26, guide plates 27, 28, a drive roller 29, a roller 30 and outlet guide plates 31, 32 toward the outside of original stock section 2.

Other stock bins 5, 6, 7 and 8 are also similarily constructed.

The original thus fed from said originals stock section 2 are supplied to an original carrying unit 33, or Caru in FIG. 1, which is constructed to ride on an original supporting glass 35 of a copier 34 for conducting optical scanning of the originals.

The originals thus placed on said glass 35 are subsequently supplied to the original receiving section 3 of the copy demand unit 1, provided with original receiving bins, 36, 37, 38, 39 and 40 respectively corresponding to said original stock bins 4, 5, 6, 7 and 8. Thus the originals 9 stocked in said stock bin 4 are returned to the receiving bin 36 after use in the carrying unit 33. In this case the originals supported between a conveyor belt 44 and a guide plate 41, a roller 42 and a guide 43 are guided to the receiving bin 36 as a guide lever 45 is rotated, as illustrated, around an axis 46 by means of a plunger.

There is provided a belt 49, driven between pulleys 47 and 48, for smoothly transporting the originals 9, particularly the trailing ends thereof, into the receiving bin 36, and such belt is provided on each receiving bin.

The pulley 47 is driven by pressure contact with the conveyor belt 44. A belt pressure plate 50 provided on the back side of said belt 44 allows the contact of said belt 44 with the pulley 47 under suitable pressure.

Now reference is made to FIG. 3, in addition to FIG. 2, showing the drive system of the apparatus wherein there is provided a sprocket 53 mounted a shaft 52 of a drive motor 51, which drives a chain 54 engaging with a sprocket 55 mounted on a drive roller 29 (FIG. 2), a sprocket 57 mounted on a shaft 56, a sprocket 58 mounted on a drive roller 25, a sprocket 60 mounted on a shaft 59, a sprocket 61 mounted on a drive roller 22, a sprocket 63 mounted on a shaft 62, a sprocket 64 mounted on a drive roller 18, a sprocket 66 mounted on a shaft 65, a sprocket 67 mounted on a drive roller 14, a sprocket 69 mounted on a shaft 68 and idler sprockets 70, 71 thus driving said original stock section in motion.

Also as to the original carrying unit 33, a sprocket 130 mounted on the shaft 52 of drive motor 51 drives through a chain 73 a sprocket 72 fixedly mounted on a shaft 131. The shaft 131 has a fixedly mounted gear 74, which engages with a gear 76 on a shaft 75 which in turn engages with an another gear 132 on a shaft 78 supporting a pulley as shown in FIG. 2. Between another pulley 77' and the pulley 77 mounted on the shaft 78 there is provided a rubber conveyor belt 79 inside of which is provided a plate 80 to constitute a suction box thereunder by means of a suction fan 81.

Under said plate there is also provided a plate 82 to constitute a suction box thereon by means of said fan 81.

Upon leaving the original stock section 2, the originals are conveyed through guide plate 83, 84 and a pressure roller 85 maintained in pressure contact with said conveyor belt 79, and transported in the direction of arrow B on said belt 79. Upon passing through said belt 79 and a guide belt 86, the original reaches said original supporting glass 35 whereupon the movement of conveyor belt 79 is interrupted by means for example, of an electromagnetic clutch (not shown) which is actuated by a leading end detecting device 87. Then, upon completion of the image forming operation for copying, said completion being detected by a scanning completion detector 88 for sensing the completion of, for example, an optical scanning of a copier, the original is ejected from the carrying unit 33 through outlet guides 89, 90 so as to be replaced by a succeeding original.

Inside the conveyor belt 79 there is provided a roller 91 for smooth ejection of the originals.

Figure 5:
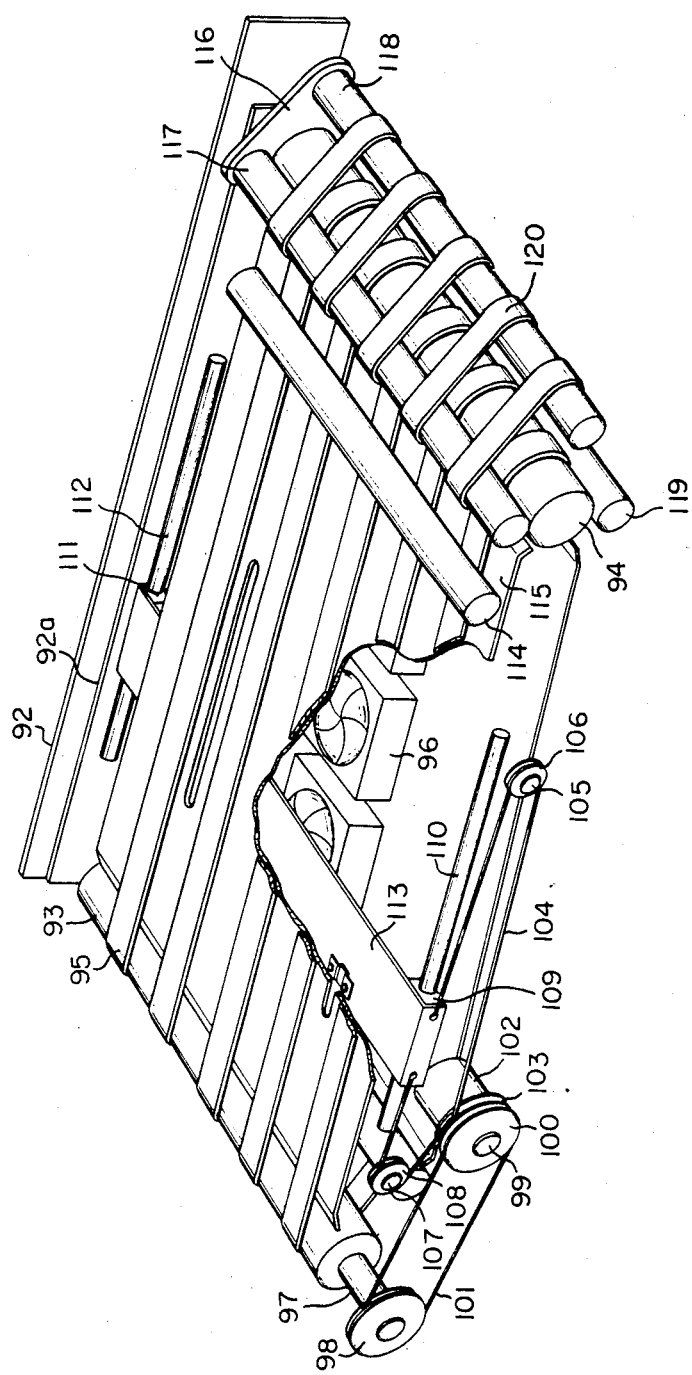
FIG. 5 is a perspective view of the transporting device thereof.

87 is a paper leading end detector which detects the retracting position of an original when said original is temporarily retracted from the glass 35 by reverse rotation of belt 79 when another original of a higher priority should be copied. Further referring to FIG. 5 showing a perspective view of said carrying unit, between two side plates 92 for supporting said unit there are provided roller side plates mainly supporting plural rollers 93, 94 in turn supporting conveyor belts 95, for example five in the number in case of FIG. 5. Said belts 95 are provided with small perforations at suitable intervals to pick up, by means of a suction fan 96, the originals when they reach the underside of said belts 95. Said suction fan is provided in the center and generates a suction force strong enough to enable such transportation by suction.

The roller 93 is driven by a drive source (not shown) through a roller pulley 98 mounted on a roller shaft 9 a pulley 100 on a shaft 99 and a belt 101 provided between said pulleys.

There is provided an electromagnetic clutch 102 for rotating a wire pulley 103, around which wound wire 104 is wound for converting said rotation into a linear displacement.

Said wire 104 is fixed at the ends thereof, through pulleys 106 and 108 respectively rotatable on shafts 105 and 107, to slide 109 provided with a slide bearing slidable on a slide shaft 110, which is fixed on a roller side plate 124' (not shown). A similar slide 111 is provided with a slide bearing slidable on an another slide shaft 112 which is mounted on the roller side plate 92a.

Between said slides 109 and 111 there is mounted a moving plate 113 for pressing the original against a stop roller 114.

Inside the conveyor belts 95 extending between the rollers 93, 94 there are provided an upper plate 115 and a lower plate 116 mounted on said roller side plate 92a.

On said belts 95 and close to an end thereof a freely rotatable stop roller 114 is mounted on said roller side plate so as to be rotated or stopped respectively when said belts 95 are in or out of operation.

Inside the roller side plates 92a there is also provided a unit for changing the direction of an original, consisting of side plates 116 on both sides, freely rotatable rollers 117, 118, 119 and belts 120 provided on said rollers corresponding to said conveyor belts.

Figure 6:
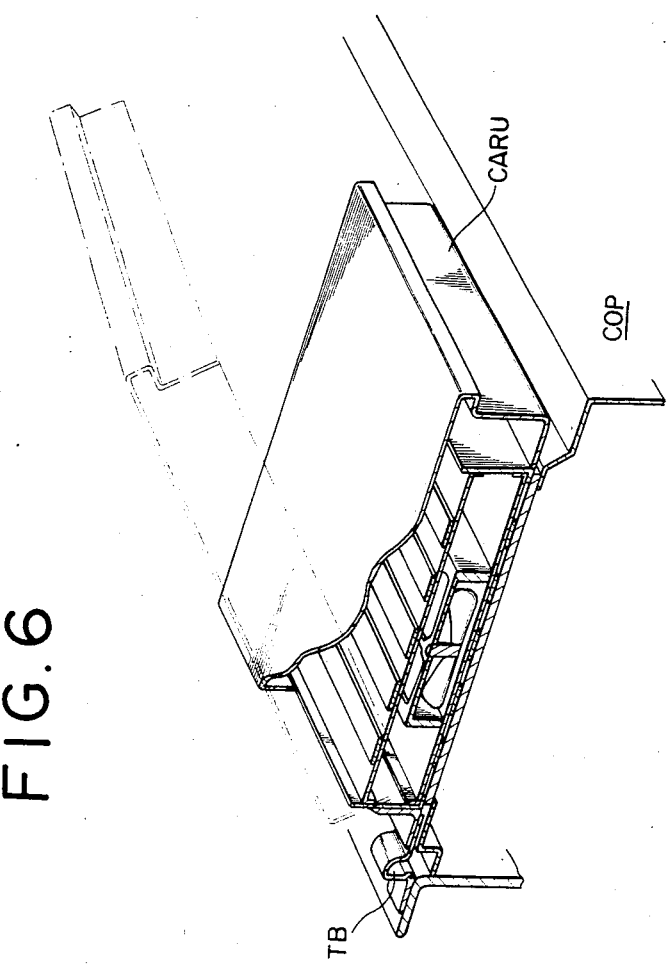
FIG. 6 is another perspective view thereof.

The carrying unit as above explained is mounted on the copier COP at an end by hinges TB as shown in FIG. 6 so as to be liftable, thereby allowing an original of a higher priority to be placed on the original glass of the copier.

Although the perforations for suction in the conveyor belts 79 in the carrying unit 33, if provided in large number, exert an excellent conveying force when the original reaches the lower side of said belts, said perforations will clearly appear on the copy if the original is smaller than the copy size. To overcome this drawback it is necessary to achieve the necessary transportation with a precise number of perforations.

The above-mentioned carrying unit 33 is driven by a gear 121.

The original receiving section 3 is provided with a conveyor belt 44 spanned between rollers 44a, 44b, and is driven by a chain 125 which engages with a sprocket 122 mounted on a shaft 75 and a sprocket 124 of the shaft 123 of said roller 44a.

Now referring to FIG. 4 showing the guide lever in said original receiving section 3, a pulley 47 mounted on a shaft 126 is maintained in pressure contact with the conveyor belt 44, while mounted on a shaft 46, by means of a key 127, are the guide level 45 and a solenoid lever 128 which is connected to a solenoid 129 by means of a pin 128, so that said solenoid lever 128 is displaceable as illustrated by means of the actuation of said solenoid 129.

The following is an explanation of a control circuit for conducting the above-explained functions. In the following description it is supposed that said circuit is provided on said copy demand unit 1 though it may also be provided in the copier if desirable.

Figure 7:
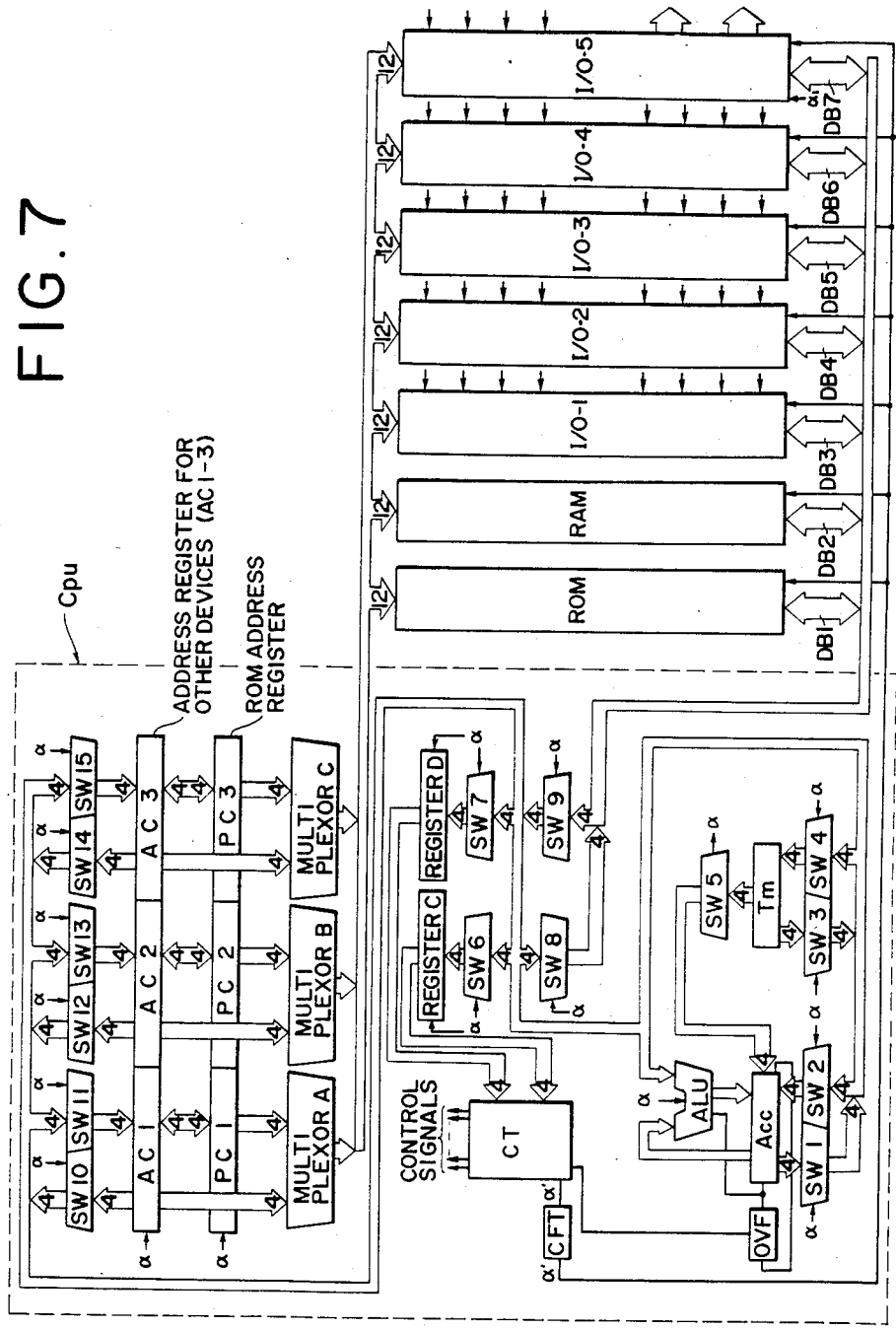
FIG. 7 is a block diagram of the control device.

Referring to FIG. 7 showing a block diagram of said control device, wherein ROM is a read-only memory storing therein a programmed sequence of functions of the automatic original handling apparatus and allowing the content thereof to be read by addressing. As will be detailedly explained in connection with FIG. 8, it memorizes the control instructions, not only the operational outputs to the equipment but also the control instructions for other circuits, in the form of 8-bit binary codes from an address 0 to a final address determined by a known matrix circuit.

Figure 9A:
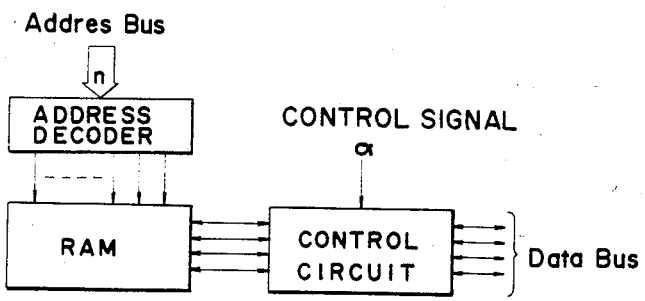
FIG. 9A is a block diagram of the random-access memory.

RAM is a random-access memory for temporarily storing control signals or the number of copies during the process control, and is composed, as shown in FIGS. 9A and 9B, of plural sets of plural flip-flops allowing formation of a set of binary codes wherein a set of plural flip-flops is selected by an addressing signal to allow entry and readout of data. Referring to FIG. 9B a memory address assumes a form for example of "X031", wherein the lowermost digit represents a column while the second lowermost digit represents a row. Each address can store a data of 4 bits, and, for example "X031" stores either a first-place data of the number of copies corresponding to the original stock bin 4 or a data "F" indicating the absence of an original in said bin.

Figure 10:
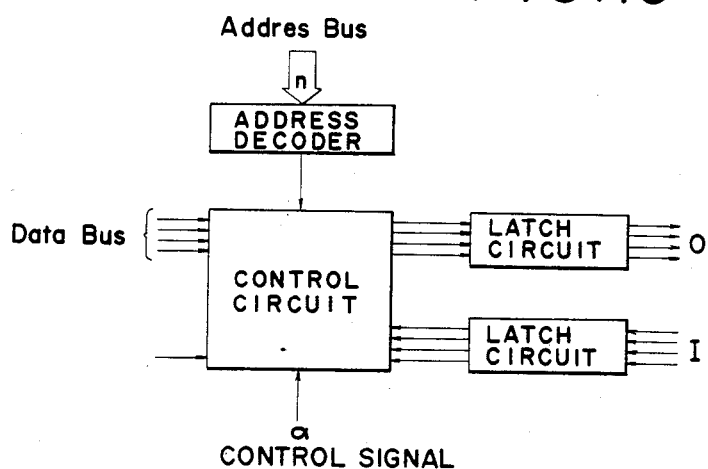
FIG. 10 is a block diagram of input-output devices I/O-1 to I/O-4.
Figure 11:
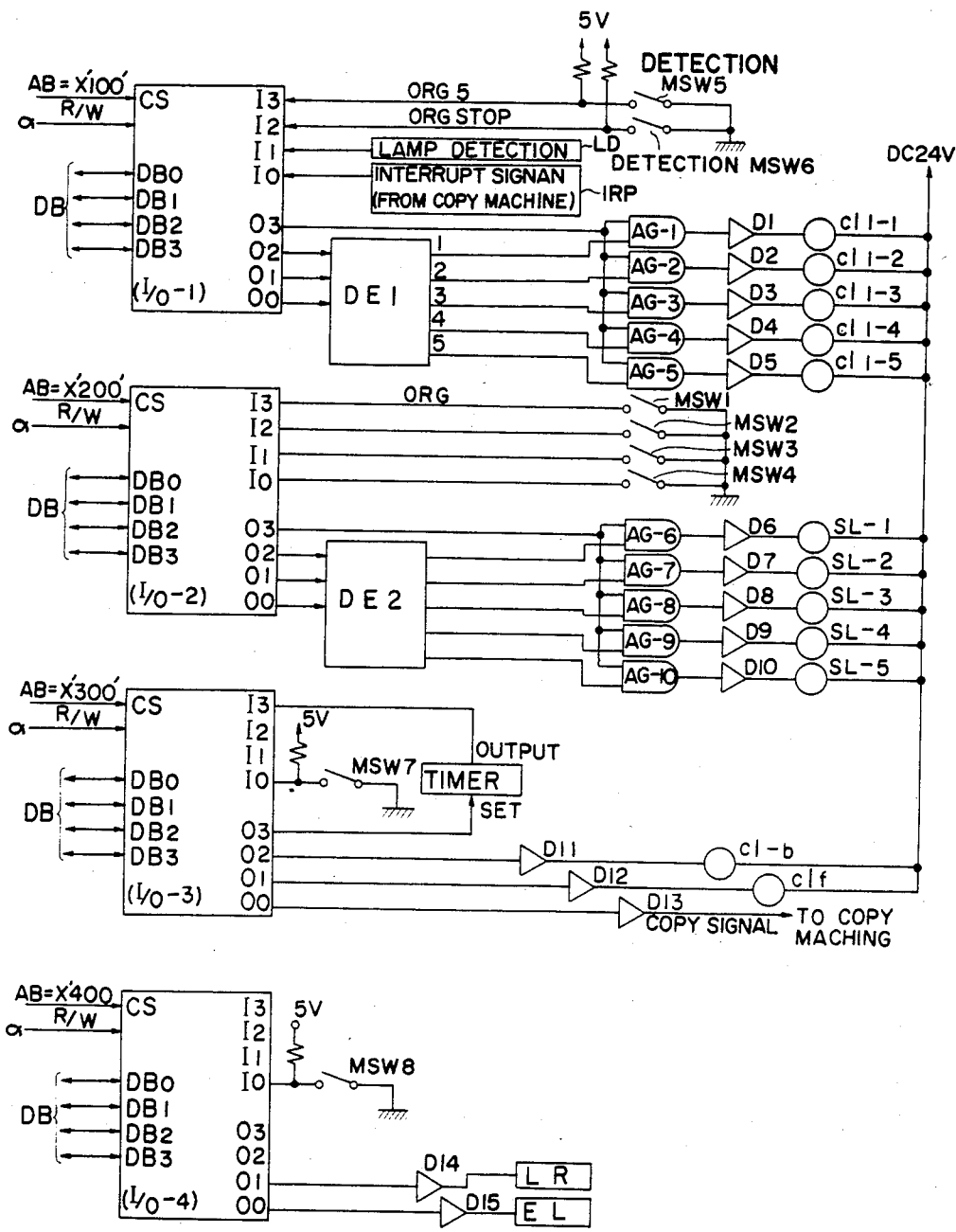
FIG. 11 is a drawing of external connections of input-output devices I/O-1 to I/O-4.

I/O-1, I/O-2, I/O-3 and I/O-4 are input/output circuits for generating data input signals indicating, for example, the presence or absence of originals in the bins or indicating the completion of copying, and the drive signals for clutches and solenoids for original feeding. FIG. 10 shows the details of said input/output circuits while FIG. 11 shows the connection thereof with peripheral circuits. In FIG. 11 there are shown microswitches MSW1–MSW5 for detecting, for example optically, the presence of originals in the original stock bins 4–8; microswitches MSW6, MSW7 for detecting the arrival of an original at a predetermined position; a microswitch MSW8 for detecting if the carrying unit Caru is set on the copier COP; a detector LD for counting the number of copies, for example by detecting the light in the exposure step; an interruption detector IRP for allowing another operation upon detection of a signal generated by a switch (not shown) provided on the copier COP; a deconder DEI for decoding the output of input/output circuit I/O-1 to start the function of pick-up rollers shown in FIG. 1 for feeding the originals placed in the stock bins 4–8, for example the pick-up roller 10 in case of the stock bin 4; a decoder DE2 for decoding the output of the input/output circuit I/O-2 to energize the solenoids SL1–SL5 of plungers driving guide levers for guiding the originals to the original receiving bins 36–40, for example the solenoid SL1 for functioning the guide 45; a warning device EL for informing by optical and acoustical signals that an original on the original glass is retracted into the carrying unit; a solenoid LR for combined control of the carrying unit and copier, achieving a lock in OFF state thereof and releasing said lock in ON state thereof; a timer TMR started by a signal from the input/output circuit I/O-3 and returning a signal thereto after a predetermined time; and clutches cl-f, cl-b for controlling the displacement of originals in the carrying unit 33.

Also, the input/output circuit I/O-3 supplies a copy signal to the copier.

Figure 12:
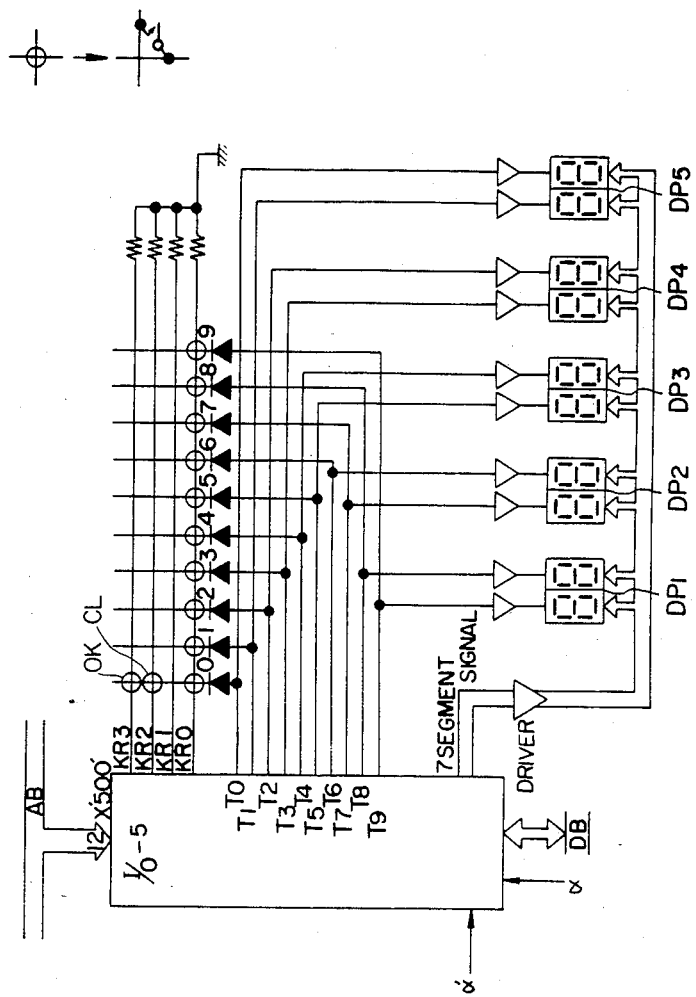
FIG. 12 is a drawing of external connections of input-output device I/O-5.

Another input/output circuit I/O-5, shown in FIG. 7 and more detailedly shown in FIG. 12, is provided for key entry of a copy number and for driving an indicator of the selected copy number, and can be composed, for example, of $\mu$PD 757 of Nippon Electric Co. In the drawing, "0", "1", "2", etc., "9" are numeral keys, CL is a clear key, and OK is a number setting completion key. DP1–DP5 are display devices for indicating the information core of the original stock bins 8–4. Further, said circuit is provided with a buffer register for controlling the key entry circuit, a shift register for storing the displayed data, and a digital signal generator for time-sharing data display, etc.

CPU, a central processing unit, is provided with registers AC, PC for addressing said memories and input/output circuits, primary-memory registers Acc, Tm, C and D, an overflow bit register OVF, a cpontrol circuit for addition-subtraction logic control of data decoding and processing and an arithmetic logic unit ALU capable of decimal correction, addition and exclusive logic addition, and is connected with the aforementioned external circuits through plural lines. Also the content of register Acc can be shifted toward right or left. In the above-explained circuit, the CPU performs the sequence control by addressing the ROM storing the programmed sequence to read the content of designated addresses through a data signal line DB1, decoding said content and, pursuant thereto, proceeding to process the data inside the CPU; for example, in the case of sequential operation, starting from power switch on, to enter or read data into or from a designated address of RAM, or supply or receive signals through the signal lines DB of input/output circuits I/O-1–I/O-5.

Now there will given a detailed description on the control procedure of the present invention.

Figure 13:
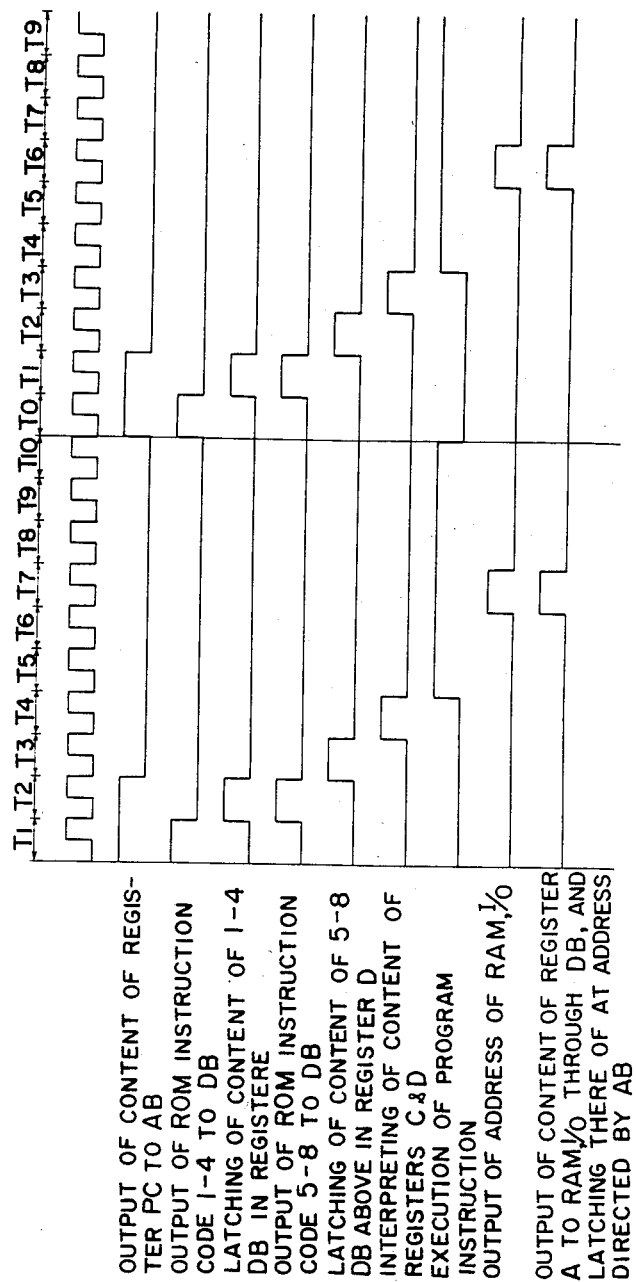
FIG. 13 is a basic timing chart.

At first the basic timing for sequence program control will be explained with reference to a clock time chart shown in FIG. 13. Each instruction of the program is coded in eight lines in the ROM. The ROM's and the addresses of instructions in each ROM are designated by ROM addressing registers PC which are step advanced by the control signal α1 to allow output of programmed instructions in succession, and the content of which is supplied to the ROM through multiplexers A–C. Each instruction code of 8 bits is supplied from the ROM in two portions in succession through a data bus DB1 of 4 bits, and is latched, through switches SW9, SW6 and SW7 controlled by the clock signals α, in registers C and D the content of which is decoded by the instruction decoder to generate a control signal α for a control according to the content of said instruction. As shown in FIG. 13, the addressing of a stored program instruction and the decoding of said instruction are completed during 4 basic clock pulses, and the execution of said instruction is conducted during succeeding 6 clock pulses. Similarly a programmed instruction stored in a succeeding address is handled in a same time interval. Consequently the execution of an instruction (1 step) in a program sequence requires a time corresponding to 10 clock pulses, or 20 clock pulses in case of a 2-word instruction.

Each switch SW is composed of a gate circuit controlled by the control signal α and OVF is a known circuit for detecting the overflow of register Acc. Also the control section CT is provided for decoding the content of registers C, D and conducting calculations on the registers Acc, Tm to generate a control signal α.

In the following there will be explained in further detail the functions of the central processing unit CPU of the aforementioned structure, wherein said CPU is composed, as an example, of μCOM4 manufactured by Nippon Electric Co.

1. 0100 X1X2X3X4 Addressing instruction Y1Y2Y3Y4 Z1Z2Z3Z4

This instruction is to transfer X1–X4 to AC3, Y1–Y4 to AC2 and Z1–Z4 to AC1.

Upon designation of an address in the ROM by PC during the execution of program, there is released, at a time T1, a code 0100 to the data bus which is latched in the register C at a time T2 through the switches SW6, 9. Said code is decoded as an addressing instruction at the same time T2, and succeeding data X1–X4 are released, at the same time T2, to the data bus and latched in a register PB3 through switches SW9 and SW15 at the time T3. Subsequently PC is step advanced to release the codes Y1–Y4 and Z1–Z4 in the succeeding address of ROM and store said codes into AC2 and AC1, thereby entering into PB a new address to be used in the subsequent program. The abovementioned timing of execution is a little different from that shown in FIG. 13.

2. 0101 X1X2X3X4 Jump instruction Y1Y2Y3Y4Z1Z2Z3Z4

This instruction, upon the jump condition for X being satisfied, is to transfer jumped addresses Y1–Y4 and Z1–Z4 to AC2 and AC1 and further to PC2 and PC1 respectively but does not perform said jump in case said condition is not satisfied.

This jump instruction is executed in case the overflow OVF is detected as "1" when X1–X4 is 0010, in case the register Acc is "0" when X1–X4 is 0100, unconditionally when X1–X4 is 1000, in case OVF is detected as "0" when X1–X4 is 1010, and in case the register Acc is not "0" when X1–X4 is 1100. In this instruction a ROM address is designated by PC in the time T1+T2, and the code 0101 is released to the data bus at the time T1 and latched in the register C through switches SW6 and SW9 at the time T2. The subsequent code X1–X4 is released to said data bus also in the time T2 and latched in the register D by the switches SW7 and SW9 at the time T3. Now assuming that X1–X4 is 0100, the codes 0101, 0100 are decoded in the time T4 as a jump instruction and an instruction for identifying the content of register Acc, and, during the time T5 to T10, it is identified if the content of register Acc is zero, and, if not, the content of PC is increased by 2 to terminate the jump instruction. If zero, the content of PC is increased by 1 to transfer the succeeding codes Y1–Y4 and Z1–Z4 to AC2 and AC1 by the switches SW9, SW11 and SW13, then further to PC2 and PC1 whereby a jumped address is stored in PC to enable designation of a new jumped address in the ROM in the succeeding cycle of T1–T10, thereby completing the jump instruction.

3. 0100 1000 Transfer instruction (1)

This instruction is to lead register Acc with an address data directed by AC. In this instruction a ROM address is designated by PC in the T1+T2, and the code 0110 is released to the data bus at the time T1 and latched in the register C by the switches SW6 and SW9 at the time T2. The succeeding code 1000 is released to said data bus also in the time T2, and is latched in the register D by the switches SW7 and SW9 at the time T3. The codes in the registers C and D are decoded in the time T4, and a code of AC is supplied at the time T5 to T10 to the address bus whereby the content of RAM, output circuit or key register for key entry device designated by said address is released by the data bus and loaded in the register Acc by the switches SW9 and SW2.

Other instructions are conducted in similar manners and are therefrom briefly summarized in the following table:

|     | Register C | Registor D | Content of Instruction |
| --- | --- | --- | --- |
| 4.  | 0111 | X1X2X3X4 | Load register Acc with X1 - X4 |
| 5.  | 1000 | 1000 | Load an address directed by AC with content of register Acc |
| 6.  | 1001 | 1100 | Exclusive OR of register Acc and a data in an address directed by AC |
| 7.  | 1110 | 0001 | Transfer AC to PC |
| 8.  | 1110 | 0010 | Transfer PC to AC |
| 9.  | 1110 | 0011 | Exchange AC with PC |
| 10. | 1110 | 0100 | Add 1 to AC |
| 11. | 1110 | 0101 | Minus 1 from AC |
| 12. | 1110 | 1000 | Transfer Acc to AC1 |
| 13. | 1110 | 1001 | Transfer Acc to AC2 |
| 14. | 1110 | 1010 | Transfer Acc to AC3 |
| 15. | 1110 | 1011 | Transfer Acc to register B |
| 16. | 1110 | 1100 | Transfer AC1 to register Acc |
| 17. | 1110 | 1101 | Transfer AC2 to register Acc |
| 18. | 1110 | 1110 | Transfer AC3 to register Acc |
| 19. | 1110 | 1111 | Transfer register Tm to Acc |
| 20. | 1111 | 0000 | Clear register Acc and OVF |
| 21. | 1111 | 0001 | Clear OVF |
| 22. | 1111 | 0010 | Clear register Acc |
| 23. | 1111 | 0110 | Left rotation of Acc and OVF to transfer OVF to Acc and A3 to OV |
| 24. | 1111 | 0111 | Right rotation of Acc and OVF to transfer A1 to OVF and OVF to A3 |
| 25. | 1111 | 1010 | Add 1 to register Acc |
| 26. | 1111 | 1011 | Minus 1 from register Acc |

In the sequence control utilizing the above-mentioned instruction codes, the codes for addressing the necessary input/output circuits and memories assume the following forms, in which X indicates that the code is not limited.

Among the address bus of 12 bits, the upper 4-bit lines, i.e., PC3 (AC3), are used for selecting the input/output circuits and memories which are respectively provided with known circuits for decoding. The remaining 8-bit lines, i.e., PC2, PC1 (AC2, AC1) are for designating partial addresses in said circuits or memories, which are respectively provided with known circuits for decoding the codes supplied through said lines.

Each input or output port of the input/output circuits in the present embodiment is composed of 4 bits respectively corresponding to the 4 bits of data, and does not require, therefore, any special interface circuit.

Now there will be given an explanation on the functions of the automatic original handling apparatus, while making reference to the aforementioned drawings and explanatory charts shown in FIGS. 14–28.

Figure 14:
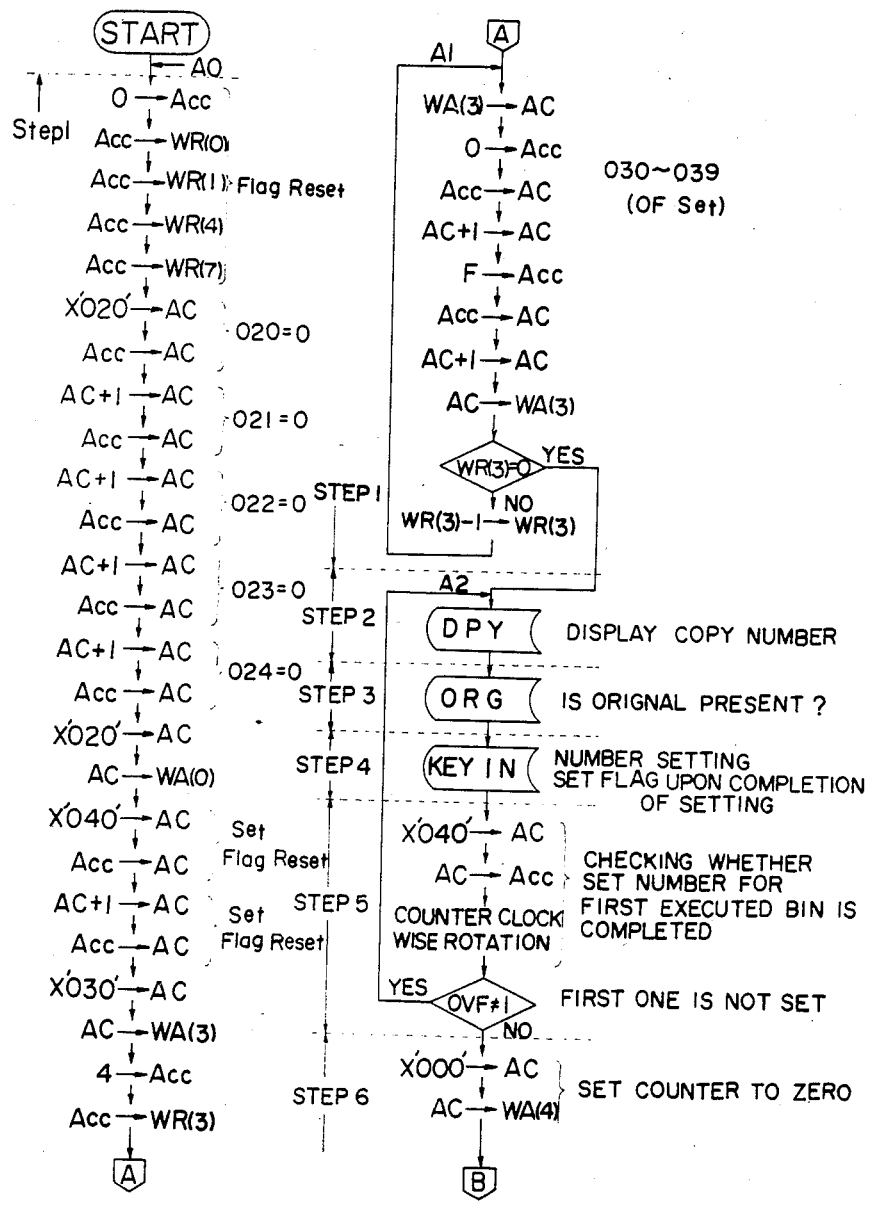
FIGS. 14–27 are explanatory drawings of the control.
Figure 15:
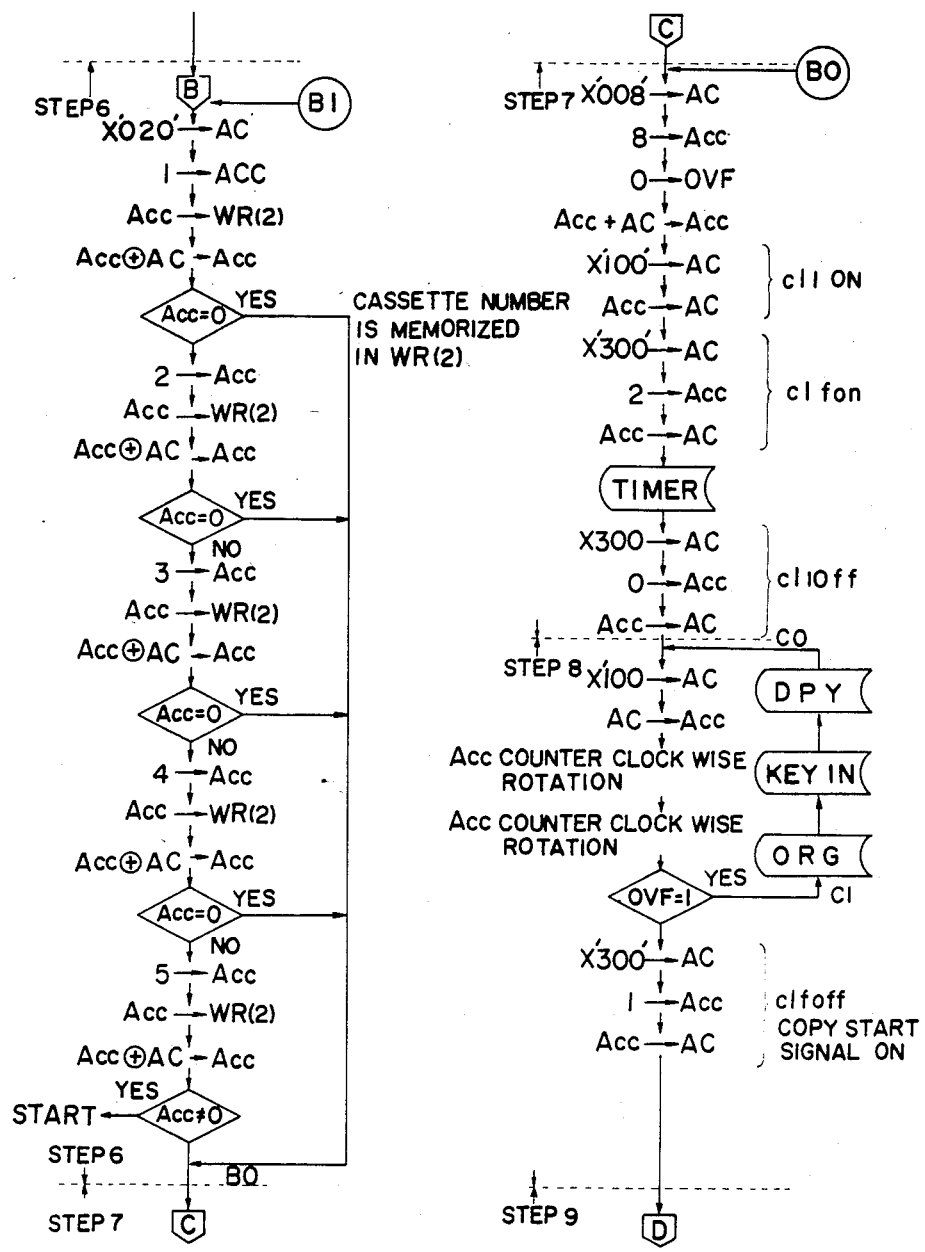
Figure 16:
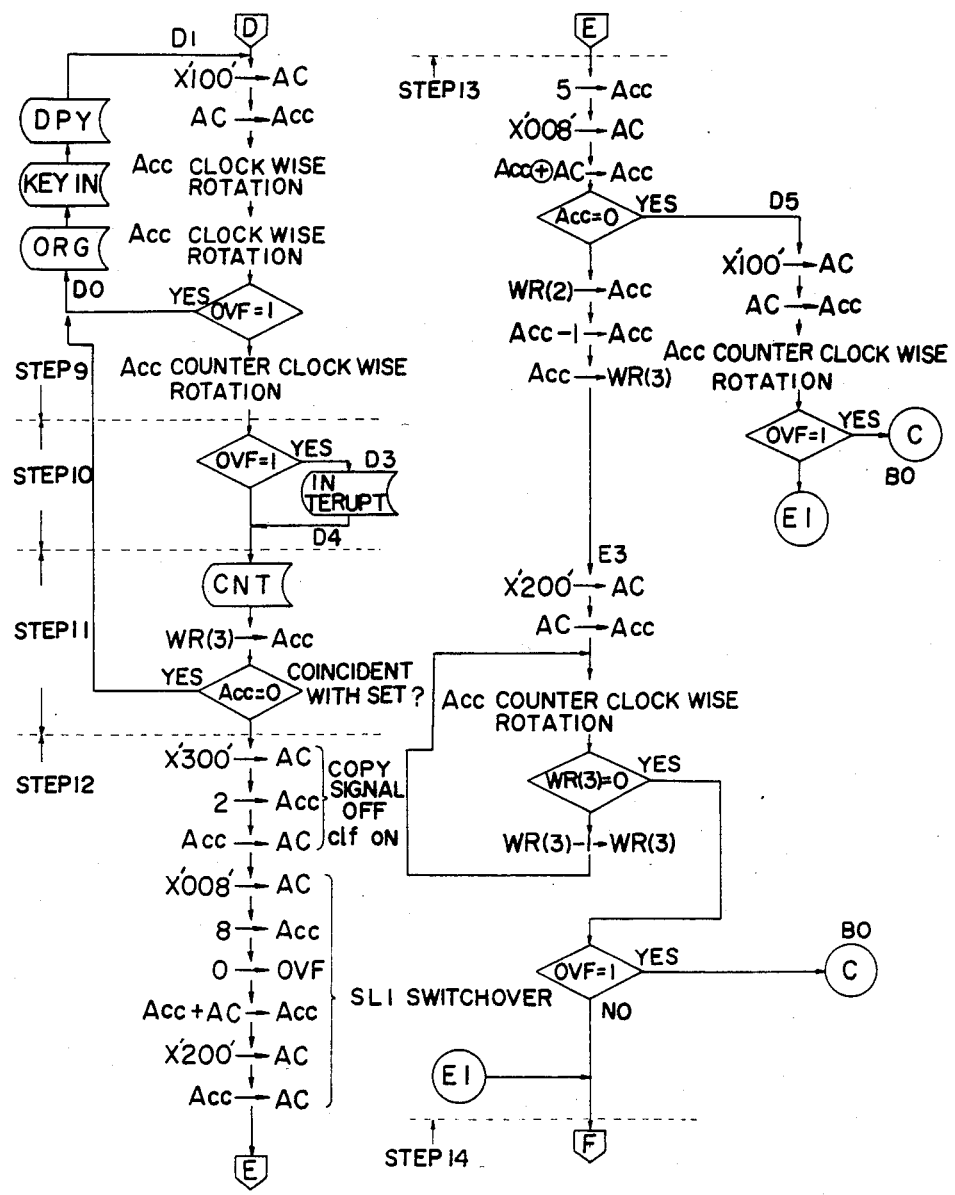
Figure 17:
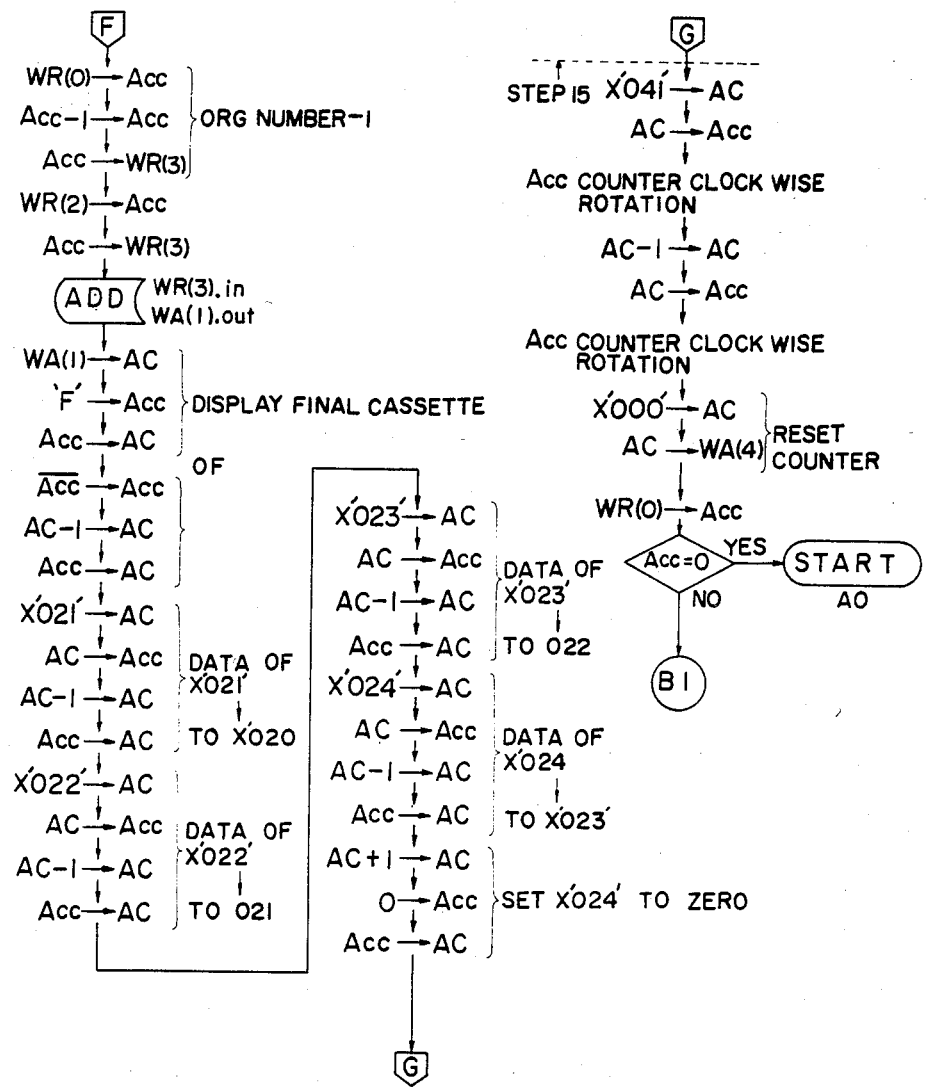

Referring to FIG. 14, the step 1 shown therein in initiated by turning on a power switch (not shown).

Initially predetermined figures are set in the flag register, copying number setting register, copy number register etc., in the RAM. For this purpose registers WR(0), WR(1), WR(4) and WR(7) in the RAM shown in FIG. 6B are cleared. Also cleared in the RAM are addresses "X020", "X021", "X022", "X023", "X024", WA(0), "X040", and "X041". In an address, for example "X020", the first "0" indicates RAM, the next "2" a row and the final "0" a column. For example, addresses X020–X024 store the processing order of the original stock bins. Also in case of absence of an original in said stock bins 4–8, a data "OFOFOFOFOF" is set in the addresses X030–X039 in the RAM in order to display "OF" on the display devices DP5–DP1, shown in FIG. 12, signifying the absence of originals.

In this manner the content of RAM is determined in the step 1.

In the succeeding step 2, details of which are shown in FIG. 13, there is conducted a control for supplying the contents of X030–X039 to the display devices DP1–DP5. At first, a data "9" is stored in the register WR(3) for selecting the display devices DP1–DP5, said data "9" being determined from fact that the segment-type display devices DP1–DP5 are provided with 10 display elements. In this case the lower place of display device DP5 is selected, started successively from the lower place of display device DP5. Then the address information "X039" of the register to be displayed is set in the register AC and then in the register WA(3).

Then the address data "X039" stored in the register WA(3) is set in the register AC and then in the register Acc. Successively a data "X500" for selecting the input/output circuit I/O-5 is set in the register AC, and the content of register Acc is transferred to a display register (not shown) of input/output circuit I/O-5. In this case the content to be displayed is "F" as explained in the foregoing. Then in order to select the display element in the upper place of the display device DP5 subtractions are made on the content of registers WR(3) and WA(3), and the data to be displayed is supplied from the RAM to the input/output circuit I/O-5.

Upon repetition of ten cycles of the above-mentioned procedure, there is completed the data transfer to the input/output circuit I/O-5 which thus performs the display of the above-mentioned data "OFOFOFOF".

Successively executed is the step 3 for indicating if originals are placed in the stock bins 4–8.

Detecting microswitches MSW1–MSW5, respectively provided on said stock bins 4–8, supply electric detection signals to the ports I0–I3, and I3 respectively of input/output circuits I/O-2 and I/O-1, wherein high (1) and low (0) level signals respectively indicating presence and absence of origianls, and there are identified the positions of said "1" signals in the ports I0–I3 of I/O-2 (X'200') and port I3 of I/O-1 (X'100') and the order of entry of said "1" signals. Thus the number of stock bin from which the first "1" signal is entered is stored in the address X020. Namely if the port I2 of input/output circuit I/O-2 receives the first "1" signal, "2" is stored in the address X'020'. Similarly the number of the original stock bin from which the second "1" signal is entered is stored in the address X021. In this manner the RAM addresses X020 to X024 memorize the numbers of stock bins in the order of copying to be made, and the copying is performed in the order of the stock bin number stored in the address X'020', then that stored in the address X021, that in X022 in the third place, that in X023 in the fourth place and finally that in X024. The addresses X020–X024 stores "0" in case of absence of the originals in the corresponding bins. For convenience, the stock bins 4–8 are respectively referred to as stock bins No. 1–No. 5.

Figure 19:
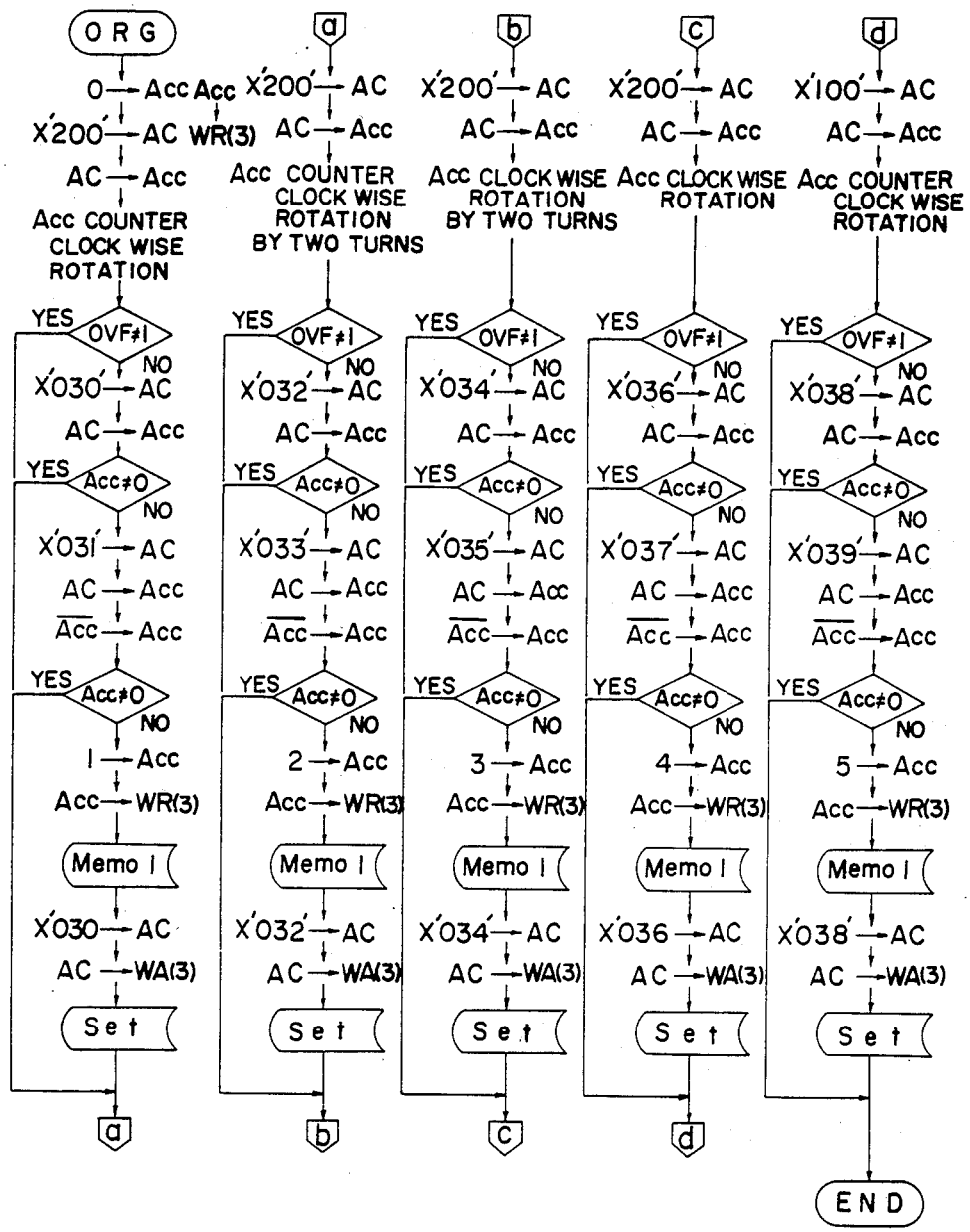

FIG. 19 shows the control sequence of the above-mentioned process, wherein the registers Acc and WR(3) are cleared, then the register AC is loaded with a data "X200" which in fact is in the form of "200" and is an address data for selecting the input/output circuit I/O-2, and the on-off states of microswitches MSW1–MSW5 indicating the presence or absence of originals are transferred from I/O-2 to the register Acc.

Then the content of register Acc is shifted by one bit to the left, namely to the overflow bit OVF, and it identifies whether or not said overflow bit OVF is "1". If not "1", it signifies that the absence of originals in the stock bin 4 is detected by the microswitch MSW1. In case of the absence of originals in the stock bin 4, the address of input/output circuit I/O-2 is set in the register AC in order to identify the state of microswitch MSW2 of the stock bin 5, whereby the "1" or "0" signals indicating the states of microswitches MSW1–MSW4 are shifted in parallel, through the data bus DB4, to the register Acc. Successively, the content of register Acc is shifted by two bits to the left to load the overflow bit OVF with a signal indicating the state of microswitch MSW2. Said content being "0" in case of the absence of originals in the stock pin 5, there will be successively conducted the identifications of the states of microswitch MSW3 and then of microswitch MSW4. In the present embodiment, as the microswitch MSW5 provided in the stock bin 8 corresponds to the input/output circuit I/O-1, the register AC is loaded with an address "X1" indicating said input/output circuit I/O-1 when identifying the state of said microswitch MSW5.

Figure 21:
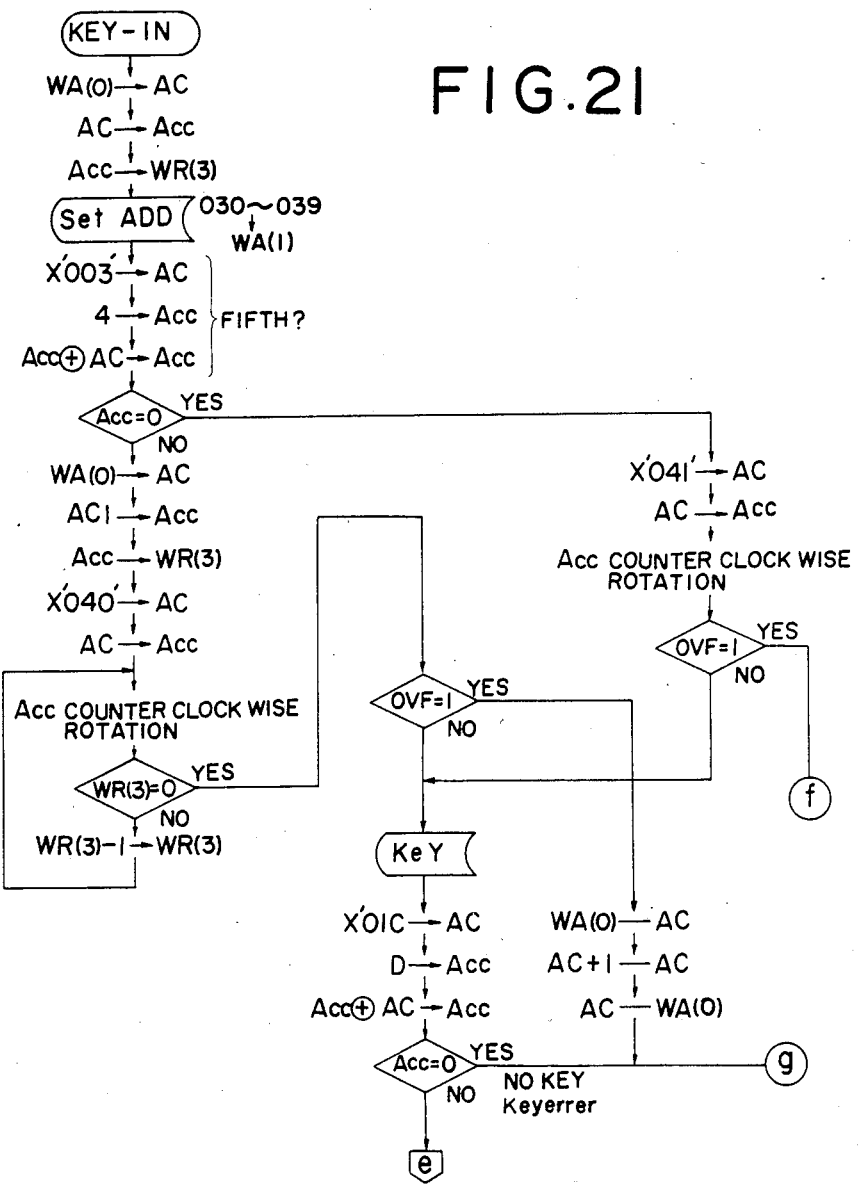
Figure 22:
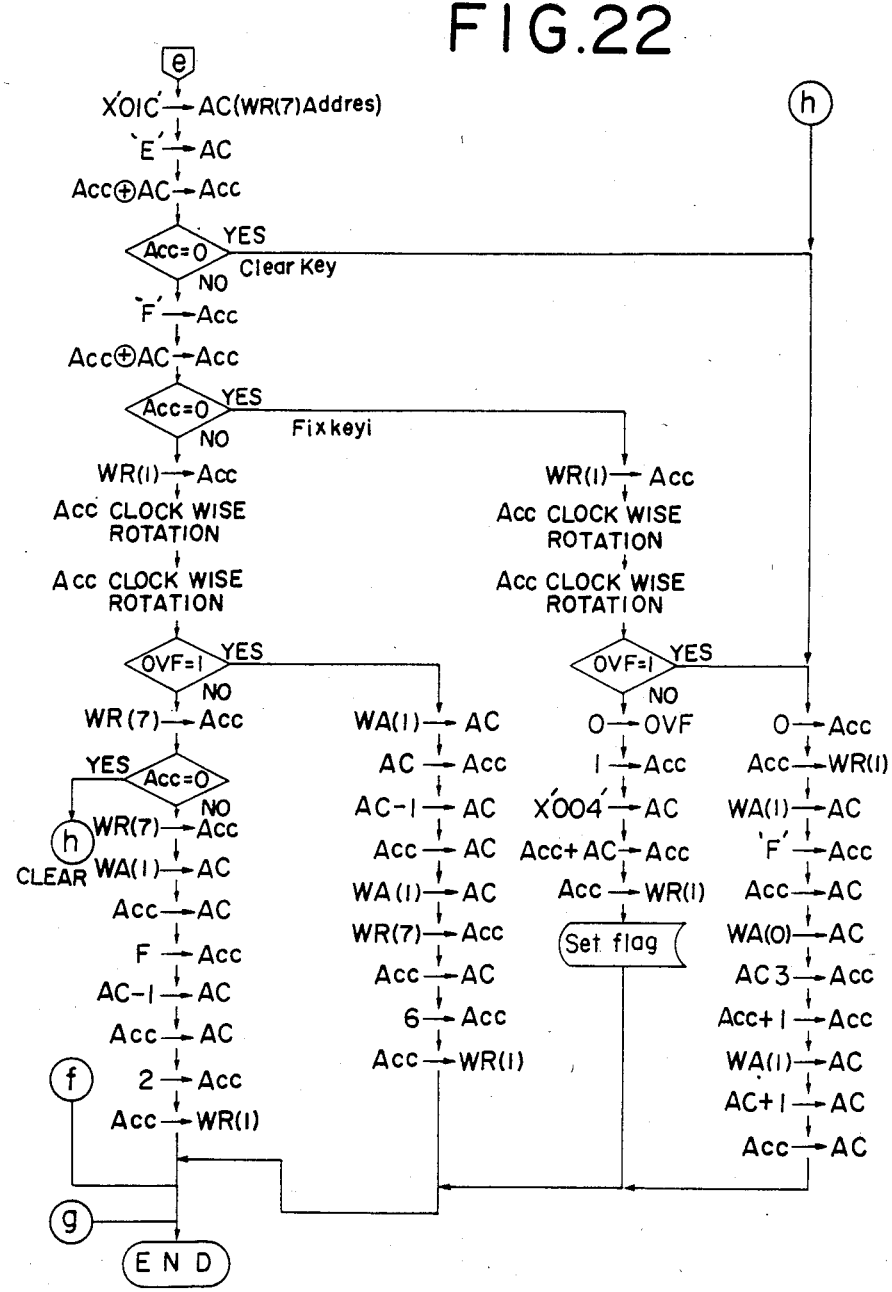

In case of the absence of originals are explained above, there is next conducted the step 4 for key entry control, details of which are shown in FIG. 21, wherein at first the content of register WA(0) of memory RAM is supplied through the register Acc to the register WR(3). As the register WA(0) is presently loaded with a data "X020" as explained in step 1, the register WR(3) is loaded with "0" of "X020".

Figure 23:
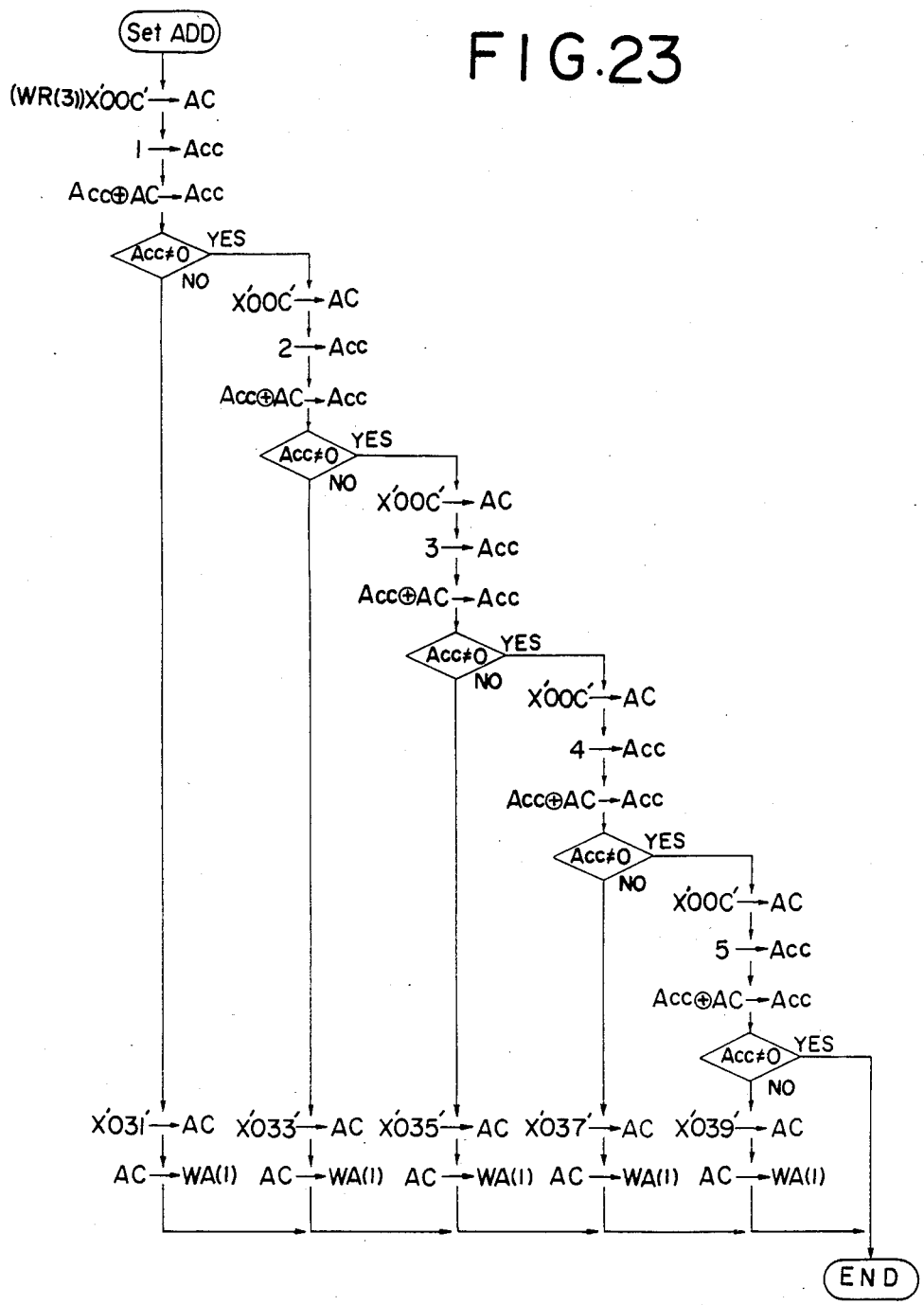

Then as shown in FIG. 23 there is executed an instruction "Set ADD" wherein at first an address data "X0c" of RAM indicating the register WR(3), is stored in the register AC.

Successively executed is a step "1→Acc" for loading the register Acc with "1".

The next step "Acc⊕Ac→Acc" which compares the content of WR(3) with that of Acc and to store the result in the registers, thereby identifying if the content of register Acc is "0" or not. Since it is "1" in this state, the above procedure is repeated after the register Acc is loaded with "2" instead of "1", and this procedure is repeated until the register is loaded with "5". if the content is "Acc≠0" the step "Set ADD" is completed, and an address "X003" for the lowermost place of register WA(0) is stored in the register AC while the register Acc is loaded with "4" to compare the lowermost, places of register Acc and of WA(0) thereby identifing whether the register Acc is "0". Since it is not "0" in this case, the content of the lowermost place of register WA(0) is stored in the register WR(3) through the registers AC, Acc. Then it is identified if the copy number setting flag is "1" or "0", and, said flag not being set in this state, there is initiated the key entry control shown in FIG. 24.

At first the register AC is loaded with an address "X500" indicating the input/output circuit I/O-4, from which the signal is supplied to the register Acc. Said input/output circuit, composed for example of µPD757 manufactured by Nippon Electric Co., receives, when selected, a 4-bit signal indicating if any key is actuated, if there is any key error and which key entry line is actuated. In order to identify if the key is actuated, the content of the register Acc is shifted to the left to transfer a corresponding signal to the overflow bit OVF. In the present case OVF is not 1 as keys are not actuated. Then a data "D" generated by ROM is set in the register Acc the content of which is transferred to the register WR(7).

In the next step shown in FIG. 21, the register AC is loaded with an address "X01c" for register WR(7) while the register Acc is loaded with data D obtained from ROM, and the unit ALU compares the contents of said register WR(7) and register Acc (exclusive logic sum) to set "0" in the register Acc and thus to complete the key entry step 4.

Successively initiated is the step 5 for identifying the completion of the copy number setting for the originals placed in the stock bins.

In this step the register AC is loaded with an address "X040" of RAM storing the copy number setting flag, and the register Acc is loaded with the content of the adddress "X040". Then the content of said register Acc is shifted by one bit to the left, and the content of overflow bit OVF is identified. Said bit being "0" in this state, the program returns to the display control of step 2 and repeats the steps 2-5 until the copy number setting is completed.

Now assuming that five originals are placed in the original stock bin 7, the microswitch MSW4 is closed, and the presence of said originals is detected by the step 3 in the following manner during the course of repeated cycles of steps 2-5. As explained in the foregoing, in the step 3, the microswitches MSW1 to MSW5 are inspected in succession, wherein the register AC is loaded with a data "X200" to store the states of microswitches MSW1-MSW4 in the register Acc. Successively the content of said register Acc is shifted by one bit to the right to transfer the state signal of microswitch MSW4 to the overflow bit OVF. Said overflow bit OVF being "1" in this state, an address "X036" is stored in the register AC and the content of said address is transferred to the register Acc. Said content being "0" in this state, then the content of the address "X037" is read and identified as "F" as aforementioned. The complement "0" of said data "F" is stored in the register Acc and it identifies whether "Acc≠0". As the content is again "0", a data "4" is supplied from ROM to the register Acc and stored in the register WR(3), thereby initiating the Memo control shown in FIG. 20.

At first the register AC is loaded with an address "X000" for WR(0), and "0" is transferred to the register Acc. The unit ALU prepares an exclusive logic sum of the contents of registers WE(0) and Acc, which result is stored in the register Acc.

Then if the content of register Acc is identified as "0", which in this case is in fact "0", an address "X020" is stored in the register AC and further transferred to the register WA(3). Then in order to transfer to data "4" stored in the register WR(3) to WA(3), there are executed the steps of WA(3)→AC, WR(3)→Acc and ACC→AC to complete the memo control. Successively an address "X036" is stored in the register WA(3) to indicate that the originals in the stock bin 7 are to be copied first, and there is initiated the Set control shown in FIG. 20.

In this control the content of register WR(0) is increased by one, then the register AC is loaded with the aforementioned data 'X036" of WA(3) and the data "1" in WR(0) is stored in the address "X036". Also the address "X037" is loaded with "F". Consequently the addresses X030-X039 are loaded with a data "OFOFOF1FOF".

Then, in the absence of key entry, there are conducted the steps 4 and 5 as aforementioned and, upon returning to the step 2, the display device DP4 provides a display "1F" while the other display devices provide displays "OF".

Figure 20:
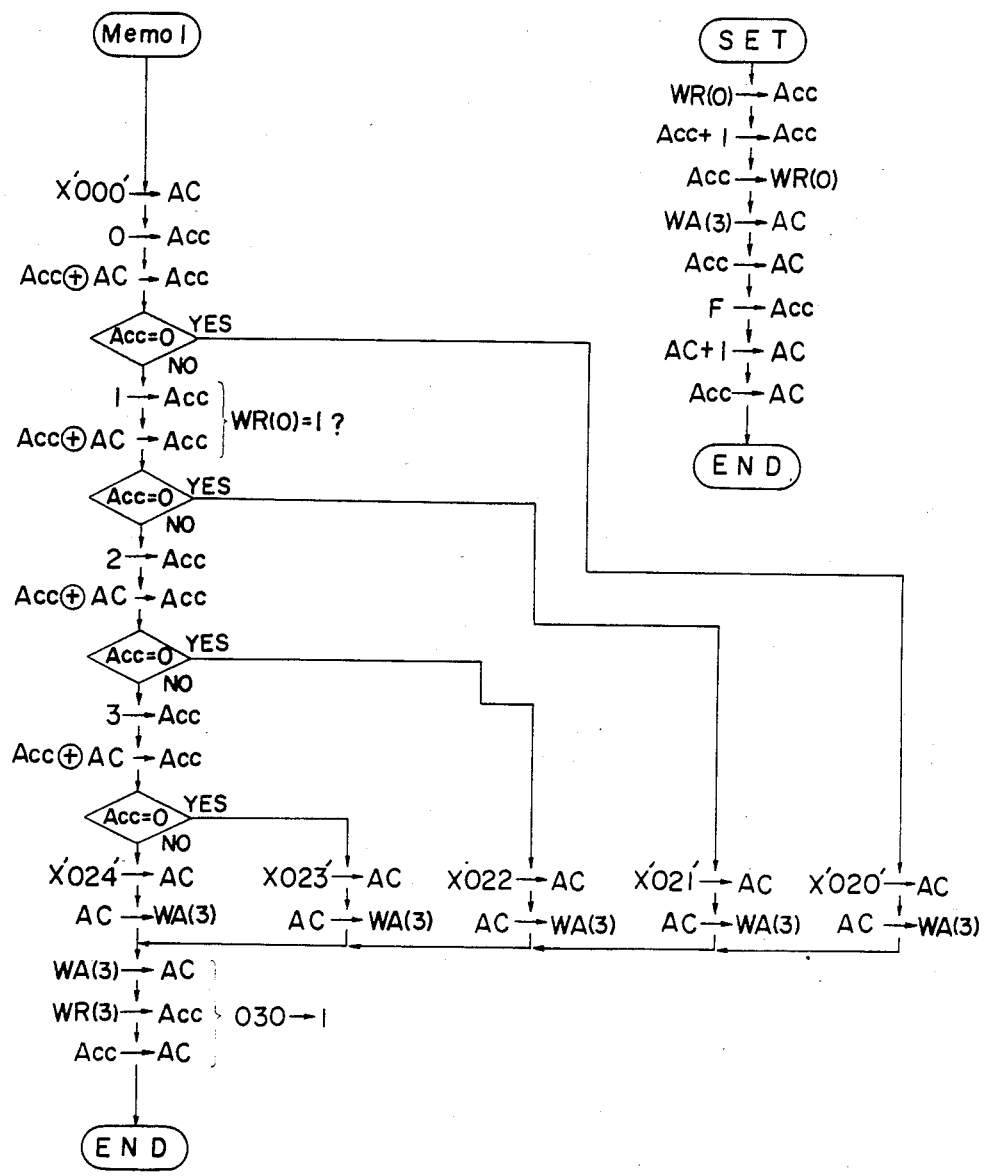

In case second originals are placed for example on the stock bin 4 after the originals have been placed in the bin 7 as explained above, the step 3 detects the actuation of microswitch MSW1 to conduct the control as aforementioned until the "memo control" shown in FIG. 20. In this case, however, a data "1" indicating the position of stock bin 4 is stored in the register WR(3). Upon entering the memo control, there is identified the content of register WR(0) which is already storing a data "1" because of the presence of originals in the stock bin 7, so that the second identification of memo control becomes affirmative to store an address "X021" in the register WA(3) and store "1" of register WR(3) in the address "X021" thereby completing the memo control.

Then in order to indicate the presence of originals in the stock bin 4 and said content being second in order, the RAM address "X039" is loaded with "2" while the register SW(0) is also loaded with "2".

When no further action is taken for a while on said second originals after the placement thereof in the stock bin 4, there is conducted the detection of originals and of key actuation in the foregoing manner, and there is again executed the display control in which the display device DP1 gives an indication "2F", DP4 indication "1F? and other display devices an indication "OF" as the addresses X030-X039 are loaded with a data "2F0-F0F1F0F".

Upon subsequent numeral key actuation, the loading of copy number data for the original stock bin 7 to be copied first is achieved in the following manner according to the key entry control of step 4. In the following explanation it is supposed that 23 copies are to be prepared from each original.

At first, in the step 1 the register WA(0) is loaded with a data "X020" whereby the register Acc is loaded with a data "4" through the register AC.

Then there is initiated the Set ADD sequence and the register WA(1) is loaded with an address "X037" which is to store a data for copy number setting for the stock bin 7.

Figure 24:
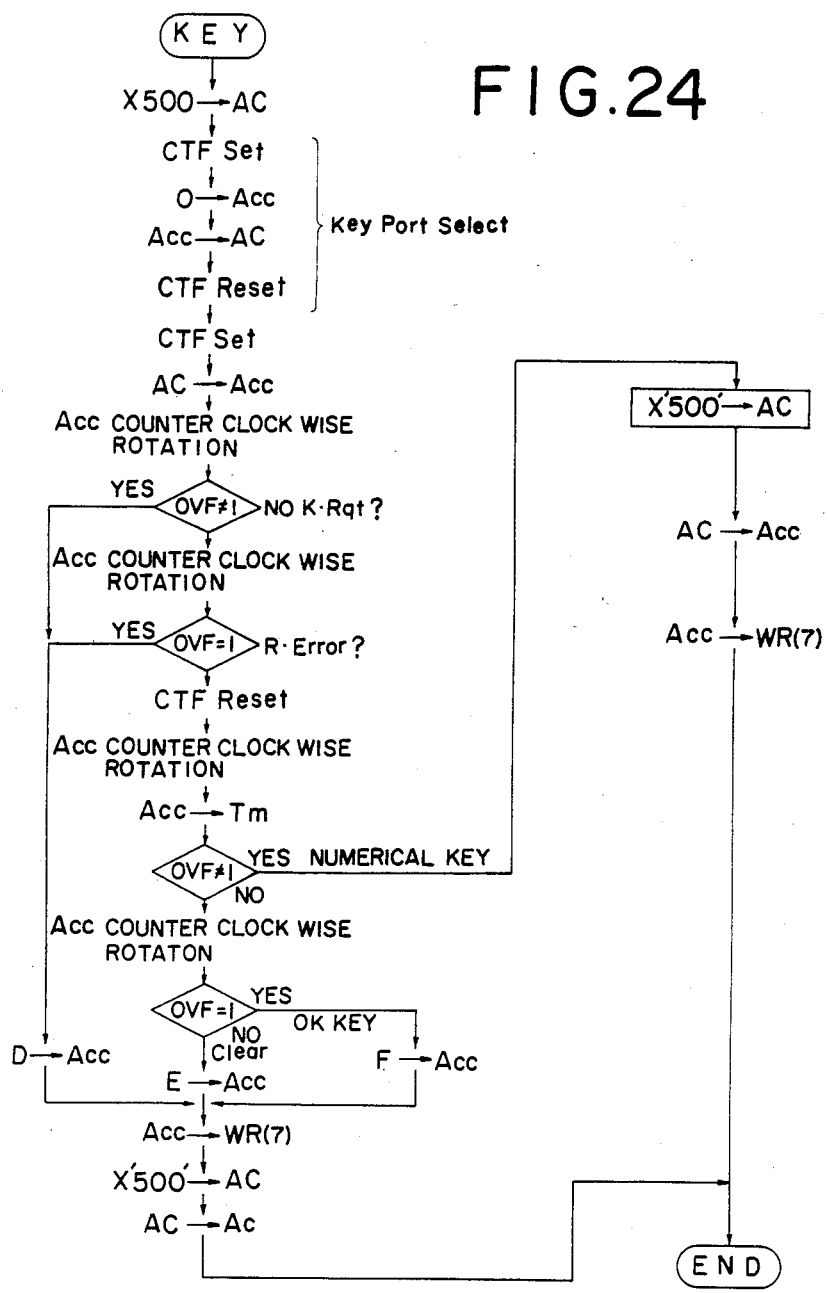
Figure 25:
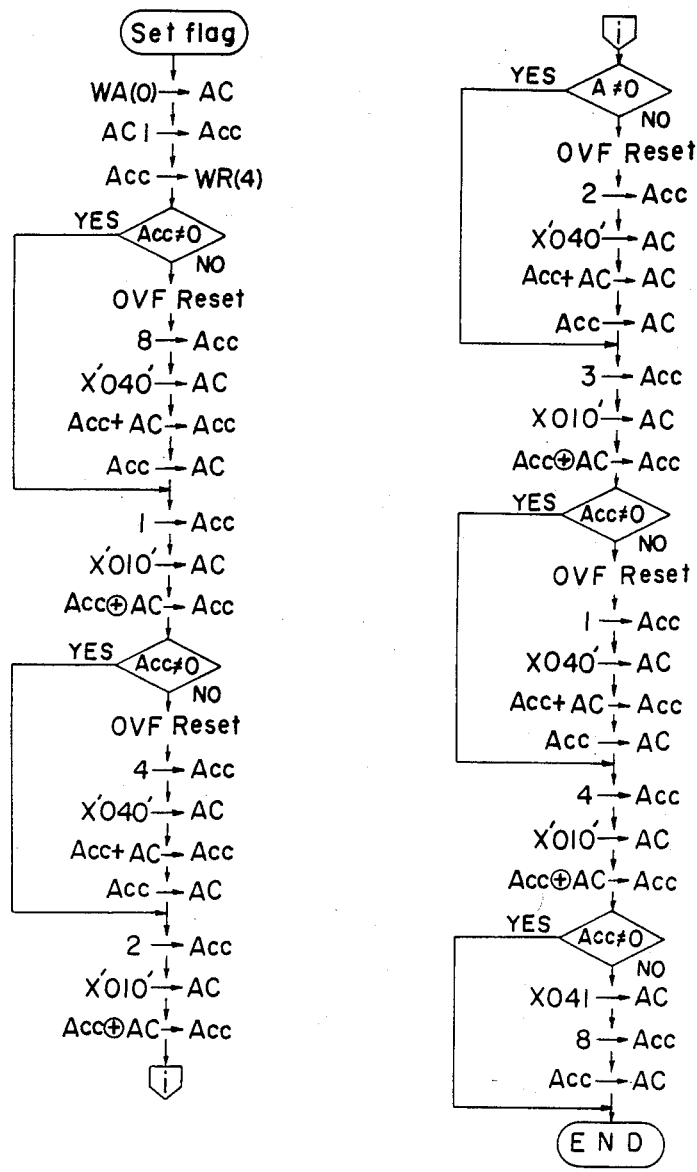

Successively there is identified if the copy number setting is completed, and, if not, the key control sequence shown in FIG. 24 is initiated to identify the actuation of numeral keys. In this case, as explained in the foregoing, the input/output circuit I/O-4 releases a 4-bit output signal to identify if any key is actuated (1 bit), if there is any key error (1 bit) and which are the corresponding signal lines (2 bits indicating KR0-KR3) and performs identification by the presence of level 1 signal in a particular bit. In case the absence of such signal a data "2" indicating the numeral keys is entered from the input/output circuit I/O-4 to the registers Acc and WR(7).

Then performed again is the identification of the key operated, and, if it is a numeral key, the content of register WR(7) is judged to identify if the key entry is for the first time.

Successively the data "2" stored in the register WR(7) is loaded into the register Acc, and the data "X037" stored in the register WA(1) is loaded into the register AC, whereby a data "2" is stored in the address "X037". Then a data "F" is stored in the address "∓X036" and a data "2" is loaded into the register WR(1) in order to memorize that numeral keys have been actuated once, thereby completing the key entry control. As the setting completion key ON is not actuated in this state, there is again started the display sequence whereby a data 2F0F0FF2OF is displayed by the display devices DP1-DP5.

Upon successive actuation of a numeral key "3" there is executed the key entry sequence shown in FIG. 20 in the foregoing manner to conduct a second identification for the key actuation, the content "2" of register WR(1) is transferred to the register Acc which is subsequently shifted by two bits to the right. Thus, when said code "2" is memorized in a form of "0010", said shift causes the overflow bit OVF to be loaded with "1" which causes the following sequence to be executed.

At first the data "2" stored in the address "X037" is transferred to an address "X036", then a data "3" is stored in said address "X037", and a data "6" (i.e., 0110) is stored in the register WR(1), thereby completing the key entry sequence. Thus upon completion of the above-mentioned key entries the displace devices DP1-DP5 indicate data "2F" "0F" "0F" "2F" "0F". The steps 2, 3, 4 and 5 are repeated as the setting completion key is not yet actuated.

Then the setting completion key for copy number is actuated. Upon identification of said actuation in the key entry sequence, a data "F" is set in the register Acc and further in the register WR(7). The actuation of said completion key OK is checked twice in a similar manner as in the foregoing numeral keys, and, upon confirmation thereof, the content of register WR(1) is identified to see if the numeral data is already set. Upon confirmation of said setting a data "7" is set in the register WR(1), and, in the Set flag sequence shown in FIG. 25 the lowermost bit "0" of WA(0) is entered into the register Acc, the content of which is subsequently identified. In order to memorize the actuation of said completion key OK, the lowermost bit "0" of "020" stored in WA(0) is entered into the register Acc the content of which is subsequently identified, and a data "1" is memorized in the uppermost bit of an address "X040". Upon actuation of numeral keys and completion key the content of WA(0) becomes "021" of which the lowermost bit "1" is stored in the second uppermost bit of said address "X040".

In this manner a flag is set in the address "X040" to allow execution of the step 5, in which the uppermost bit of said address "X040" is loaded into the overflow bit OVF, and the control section CT executes the identification if OVF≠1. The OVF being 1 in this state, the program proceeds to the step 6, in which a register WA(4) is cleared for storing the count data of copy number.

Then the number of original stock bins stored in the address "X020" is loaded in the register WR(2), said bins 4-8 being numbered from No. 1 to No. 5 in order. In this case, therefore, a number "4" is memorized in the WR(2). Successively initiated is the execution of step 7.

In said step 7 the address "X008" of WR(2) is set in the register AC, and a data "8" is transferred from ROM to the register Acc to execute Acc+WR(2)+Acc. Successively, the address "X100" of input/output circuit I/O-1 is set in the register AC and the data "12" or "D" stored in the register Acc is supplied to the input/output I/O-4 to release a data "1100" at the terminals Q3-Q0, of which the uppermost bit opens the gates AG1-AG5 while the data "100", being applied through the decoder DE1 to the other input terminal of the AND gate AG4 to activate a clutch cl-4 thereby advancing an original from the stock bin 7.

Then, in order to feed said original to the copier, an address "X300" is set in the register AC and a data "2" is set in the register Acc to drive a clutch cl-f, in a similar manner as explained above.

Said clutch cl-1 is cut off upon completion of feeding after a period predetermined by the timer TMR. The arrival of an original at a predetermined position is detected by a detecting means SW6, which corresponds to 87 in FIG. 2. During the course of the above-mentioned sequence, there is identified the copy number setting for the originals in the stock bin 4. For example, in case a numeral key is actuated in order to set a copy number "9", an address "X020" stored in the register WA(0) memorizing the order of placing of originals into the stock bins is changed to "X021" by the flag in the address "X040".

In the successive key entry sequence the data "9" and "F" are entered, in a similar manner as aforementioned for the entry of "2" for copy number setting for the originals in the stock bin 7, respectively into the addresses "X031" and "X032" since the data in register WA(0) is "X021" in this case. Upon succeeding actuation of the setting completion key, a number setting flag "1" is set in the addresses "040" and "041" in the RAM in the above-explained manner. In this case, since the order of copying is second, the flag "1" is set in a bit corresponding to "4" in the address "040".

After the above-mentioned key operations and upon identification of the arrival of an original at a predetermined position on the original carriage by the step 8, the clutch cl-f is cut off to terminate the displacement of said original, and a copy start signal is released from the input/output circuit I/O-3 to cause the copier to initiate the copying operation.

During the succeeding step 9 in which the copier performs the steps of charging, exposure, development, image transfer and fixing, there is executed a control for counting the copy number by detecting the light from a light source of the copier used in the exposure step. Also similarly as in the step 8, in the course of above-mentioned control there can be executed the entry and display of copy number setting for other stock bins.

Figure 27:
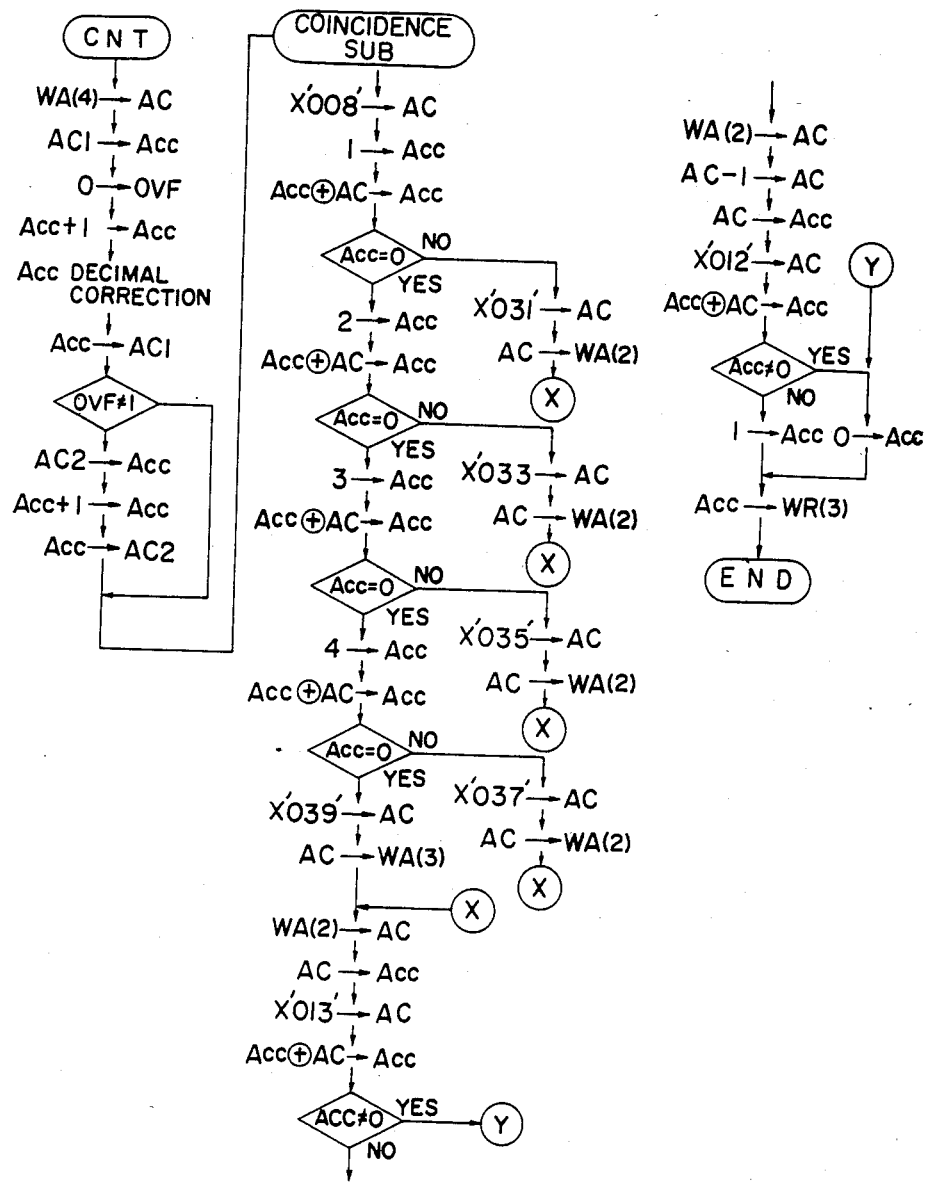

The above-mentioned control for copy detection is achieved by receiving a signal from the detecting means LD at the port $I_1$ of the input/output circuit I/O-1, wherein the completion of one copy is indicated by a "1" signal corresponding to the detection of said light. The contents of ports I3–I0 of said input/output circuit I/O-1 are transferred to the register Acc the content of which is shifted by two bits to the right to load the overflow bit OVF with the state of port $I_1$. If said state is not "1", the identification as to whether any new originals are received in the stock bins and whether any new key operation is made are conducted, as well as the display sequence of the contents of RAM addresses "X030"–"X039" in the above-explained manner until a "1" signal is received from the detecting means LD. Upon receipt of said "1" signal at the port $I_1$ of input/output circuit I/O-1, the content of register Acc is shifted by one bit to the left, and there is identified the state of port I0 for receiving an interrupt signal from the copier. A "1" signal, indicating an interruption, can be supplied from the copier to the port I0 of input/output circuit I/O-1 by pressing the copy button or an interruption demand button on the copier in case one or more copies are urgently needed. Upon detection of said signal the control device maintains the current state thereof and enters the step 11 upon termination of said interrupt signal. If there is no interrupt signal, the program immediately proceeds to the step 11 to compare the copy number with the set number by count sequence CNT, the details of which are shown in FIG. 27. Referring to FIG. 27, the register WA(4) remains cleared in the step 4, thus supplying the lowermost bit "0" to the register Acc, to which 1 is added to the ALU which again stores the result of addition in the register Acc. Upon further decimal correction in ALU, the content of register Acc is transferred to the register AC1.

Then identified is whether the overflow bit OVF is in a state OVF≠1. As the OVF is not 1 in this stage, the content of register WR(2) is read and identified in order to select the address "X030"–"X030" storing the copy number setting data. As the register WR(2) stores a data "4", the address "X037" is introduced into WA(2) and then to the register AC, whereby the data "3" stored in the address "X037" is loaded into the register Acc. Successively, the data of lowermost bit of register WA4 is read and compared with the content of register Acc. As Acc is not being zero in this state, the program proceeds to the sequence Y to clear the registers Acc and WR(3) thereby completing the sequence CNT. Successively, the content of register WR(3) is transferred to the register Acc to execute identification if Acc=0. If the result of identification is affirmative in this case, the program returns again to the step 9 of original detction etc. If the copy start button of the copier is maintained in a closed state, the copier continues the copying operation of the original placed on the original carriage. When the content of the lowermost bit of register WA(4) becomes "3" wherein Acc is not 0 in the comparison in the sequence CNT of the content of address "X037" and the content of the lowermost bit of WA4, the program does not proceed to the sequence Y but changes the address data "X037" in register WA(2) to "X036" thereby executing the comparison of the content of address "X036" and the content of address "X012" of register WA(2). As Acc is 1 in this state, there are therefore executed the sequences of steps 9, 10 and 11 by which the content of register WA(4) is step advanced each time. In case of an interrupt signal is generated by a switch (not shown) of the copier, for example during fifth copying for the first original in the stock bin 7, said signal is read through the port I0 of input/output circuit I/O-1 simultaneously with the detection of fifth copying at the data reading in the step 9, and, after the confirmation of completion of fifth copying in the overflow bit OVF by the two-bit shift to the right of register Acc, said interrupt signal is introduced into the overflow bit OVF by a one-bit shift to the left of said register Acc, thereby enabling the interrupt sequence shown in FIG. 26.

In said sequence the register AC is loaded with an address data "X300" for selecting the input/output circuit I/O-3. Then the register Acc is loaded with a data "4" for selecting the output port O2, thereby releasing a signal therefrom for activating a clutch Cl-b and terminating the copy signal released from the output port $O_0$.

The activation of said clutch cl-b causes a driving means (not shown) to reverse the rollers 77, 78, thereby transporting the original on the original supporting glass 35 onto the belts above the plate 80. Said original is naturally sucked toward the belts 79 by the suction fan 81. Through the above-explained operation the original continues to move until it is detected by a detecting means 92, which, upon said detection, closes a switch SW7 to send a "1" signal to the port $I_o$ of input/output circuit I/O-3. Said signal is loaded into the register Acc and identified in the overflow bit OVF by a one-bit shift of said register Acc to the right. Upon detection of said "1" signal, the register AC is loaded with an address "X300" for selecting the input/output circuit I/O-3 while the register Acc is loaded with "0" to change the output signals from the ports $O_0$–$O_3$ of input/output circuit I/O-3 to zero and to cut off the clutch Cl-b for driving the conveyor belts 79 thereby terminating the movement thereof. In this manner the original is retracted into the carrying unit.

Successively there is selected the input/output circuit I/O-4 which, by the data "3", informs the completion of original retraction for operation by the indicator EL and activates a solenoid LR to disconnect the link between the copier COP and the carrying unit Caru.

Then the operator lifts an end of said carrying unit Caru as shown in FIG. 6, places an original to be copied urgently on the original supporting glass 35, and obtains the desired copies by pressing the copy start button provided on the copier COP.

On the other hand, during said interrupt operation, the control device continues to detect the state of input port $I_o$ of input/output circuit I/O-1.

Upon completion of said urgent copying operation and upon returning of the carrying unit Caru to the original position by the operator to open the interrupt switch, the input port I₀ of input/output circuit I/O-1 receives a "0" signal whereby the overflow bit OVF becomes "0" to identify the completion of interrupt operation.

Upon returning the carrying unit Caru to the original position, a switch SW8 supplies a signal to the port I₀ of input/output circuit I/O-4, which signal is identified by the overflow bit OVF to enable the following sequence.

In order to restart the copying for the original which has been in the copying operation prior to the interrupt sequence, the register AC is loaded with an address "X300" for selecting the input/output circuit I/O-3 while the register Acc is loaded with a data "2" to activate the clutch Cl-f thereby transporting the retracted original to the original supporting glass 35 by means of said belts 79. Upon detection of the arrival of said original at said glass 35 by the microswitch SW6, the clutch Cl-f is deactivated and a copy signal is again supplied to the copier COP to restart the interrupted copying and to enable the sequence of step 11. In this sequence the register WA(4) is loaded with a data "5" indicating the number of already completed copyings, which is compared with the set number "23". The comparison being identified as not equal, there is repeated the sequence of step 9 starting from ORG, KEY IN and DPY. Upon entry of a data "23" into the register WA(2) which coincides with the data "23" memorized in the addresses "X036" and "X037", the last step in the sequence CNT sets "1" into the register Acc of which content is further set in the register WR(3). The last identification (if Acc=0) being negative in the step 11, there is enabled the execution of step 12 wherein the port of input/output I/O-3 releases a "0" signal indicating the termination of copy signal. Also, in order to replace the original on the copier with the next original, the drive means in the carrying unit 33 is activated by the clutch cl-f to start displacement of said original, which is forwarded to one of the original receiving bins 36-40 selected by a guide lever 45 actuated by one of solenoids SL-1–SL-5. The solenoid SL-1 cooperates with the receiving bin 36, while the solenoid SL-2 cooperates with the receiving bin 37, and so on. In this case, in response to the activation of clutch cl-4 for the original stock bin 4, the solenoid SL-4 is activated to return the aforementioned original to the receiving bin 39.

Upon completion of the above-mentioned sequence the sequence of step 13 is initiated in which at first the ports I0, I1, I2 and I3 of input/output circuit I/O-1 and port I3 of input/output circuit I/O-2 are checked as to the inputs thereto in order to identify the presence of remaining originals in the stock bin under processing. If any remaining originals are present in said bin 7 in this case, the program returns to the step 7 and repeats the procedure explained in the foregoing. Upon completion of copying operations on the five originals in said bin 7, the program proceeds to the step 14 wherein at first 1 is deducted from the content of register WR(0), namely from "2" to "1", storing the number of stock bins containing originals to be copied. Then in order to change the display on the display device DP4 from "23" to "OF" corresponding to the absence of originals in the stock bin 7, there is conducted a sequence of reading "4" from the register WR(2), loading the register WA(1) with an address "X037", leading "F" into the address "X037", changing said address from "X037" to "X036", and loading the address "X036" with "0".

Successively, the contents of "X020"–"X025" are shifted to the left, and finally a data "0" is loaded into the address "X024" to complete the step 14.

In the succeeding step 15 there is executed a sequence of shifting the contents of addresses "X040" and "X041" by one bit to the left, resetting the copy counting register WA4, and returning the program to the step 1 if the register WR(0) is "0" or to the step 6 if the content of register WR(0) is not "0" indicating the presence of originals in other stock bins. Although the copy number is taken as the copying condition is the foregoing example, it is also possible to similarly determine other conditions such as the copy density.

As detailedly explained in the foregoing, the automatic original handling apparatus of the present invention can be provided with a wider freedom of operations because of the presence of a means for altering the order of priority of image formation.

What we claim is:

1. An image formation apparatus comprising:
    memory means capable of memorizing different copy conditions for each of a plurality of originals, wherein said memory means has a plurality of memory locations for memorizing in respective locations said copy conditions for each of said plural originals;
    image forming means operable in accordance with image forming operating conditions for one said original, derived from one of said memory locations, for carrying out the image forming operation of said image forming means for said one original under the derived conditions;
    interrupting means for interrupting the image forming operation; and
    means for resuming the image forming operation for the one original of said plurality of originals, the image forming operation of which has been interrupted, after termination of the interruption by said interrupting means.

2. An apparatus according to claim 1, further comprising:
    an original stock member capable of storing said plural originals;
    means for feeding one by one the plural originals stored at said original stock member;
    original carrying means for transporting the plural originals from said feeding means to said image forming means;
    means for retracting, when said detecting means detects the interruption demand, one of said plural originals from said image forming means into said original carrying means.

3. An apparatus according to claim 2, further comprising an engaging means for maintaining said image forming means and said carrying means in mutual engagement.

4. An apparatus according to claim 3, further comprising means for disconnecting said engagement between said carrying means and said image forming means, in response to the operation of said retracting means, after one of said plural originals transported to said image forming means is retracted by said retracting means.

5. An apparatus according to claim 4, further comprising means for indicating the completion of retraction of one of said plural originals after said original transported to said image forming apparatus is retracted by said retracting means.

6. An apparatus according to claim 5, further comprising means for sensing that said carrying means is displaced after disengagement between said image forming means and said carrying means, and for sensing such re-engagement.

7. An apparatus according to claim 6, further comprising means for identifying a signal from said sensing means, and means for controlling said carrying means to transport a said retracted original to said image forming means.

8. An image formation apparatus comprising:
   means for supporting a plurality of originals;
   means for transporting one by one the originals supported on said supporting means;
   means for interrupting the image forming operation of said image forming means which is being carried out for the original;
   first control means, responsive to said interrupting means, for withdrawing the original for which the image forming operation is being carried out; and
   second control means for resuming the image forming operation for the withdrawn original, said second control means first allowing the withdrawn original to be transported to said image forming means, and then controlling said transporting means to transport the remainder of the originals supported on said supporting means to said image forming means.

9. An apparatus according to claim 8, wherein said supporting means includes a plurality of bins and said plurality of originals are placed in the respective bins.

10. An apparatus according to claim 8, wherein said first control means withdraws the original to said transporting means.

11. An apparatus according to claim 8, further comprising a memory for memorizing numbers corresponding to the numbers of copies to be formed for the respective original.

12. An apparatus according to claim 11, further comprising third control means for controlling said image forming means to provide the respective number of copies for the original.

13. An image formation apparatus comprising:
   means for supporting a plurality of originals;
   means for forming images of the originals;
   means for transporting each of the originals supported by said supporting means to said image forming means, said transporting means having means for engaging and disengaging said transporting means with said image forming means;
   means for interrupting the image forming operation of said image forming means which is being carried out for one of the originals, and for controlling said transporting means to disengage from said image forming means;
   control means operable in response to termination of an interruption and re-engagement of said image forming and transporting means, for resuming the image forming operation for the interrupted original.

14. An apparatus according to claim 13, wherein said control means comprises a memory for memorizing a series of instructions for discriminating between the re-engagement and the resuming operation.

15. An image forming apparatus comprising:
   first means for supporting a plurality of originals;
   means including an image forming station, for forming an image of an original located at said image forming station;
   means for transporting one-by-one the originals from said supporting means to said image forming station of said image forming means;
   means for interrupting the image forming operation of said image forming means which is being carried out for any one original located at said image forming station;
   first control means, responsive to said interrupting means, for operating said transporting means to withdraw from the image forming station the original for which the image forming operation is being carried out; and
   second control means for resuming the image forming operation for the withdrawn original, said second control means first operating said transporting means to transport the withdrawn original back to said image forming station to complete image formation thereof, and the operating said transporting means to transport the remainder of the originals supported on said supporting means to said image forming station of said image forming means unless further interrupted by said interrupting means.

16. An image formation apparatus according to claim 15, in which said second means holds the withdrawn original.

17. An image processor comprising:
   means for storing a plurality of image informations for forming a corresponding plurality of individual images;
   means for processing the image informations;
   means for feeding the plurality of image informations to said image processing means one-by-one;
   means for interrupting image processing to be executed with respect to the plurality of image informations;
   first control means operable in response to the interrupting means for withdrawing any selected one of said image informations during processing; and
   second control means for feeding the withdrawn image information to the image processing means to resume image processing on the selected image information and subsequently feeding the remainder of the plurality of image informations to said image processing means.

* * * * *

UNITED STATES PATENT AND TRADEMARK OFFICE
CERTIFICATE OF CORRECTION

PATENT NO. : 4,568,177

DATED : February 4, 1986

INVENTOR(S) : TADASHI SATO, ET AL.

Figure 8:
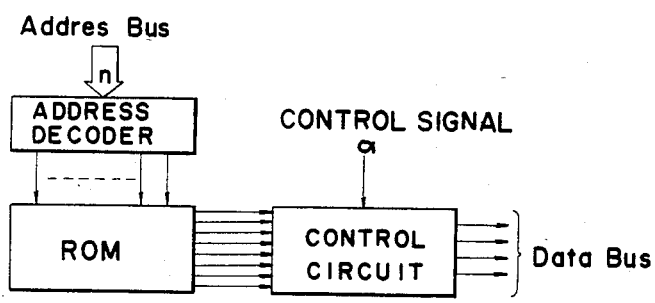
FIG. 8 is a block diagram of the read-only memory.

It is certified that error appears in the above-identified patent and that said Letters Patent is hereby corrected as shown below:

IN THE DRAWINGS:

In Figs. 8, 9A and 10, "ADDRES" should read --ADDRESS--.

In Fig. 11, "SIGNAN" should read --SIGNAL--; and MACHING" should read --MACHINE--.

In Fig. 13, "REGISTERE" should read --REGISTER--.

In Fig. 21, "Keyerrer" should read --Key error--.

Figure 26:
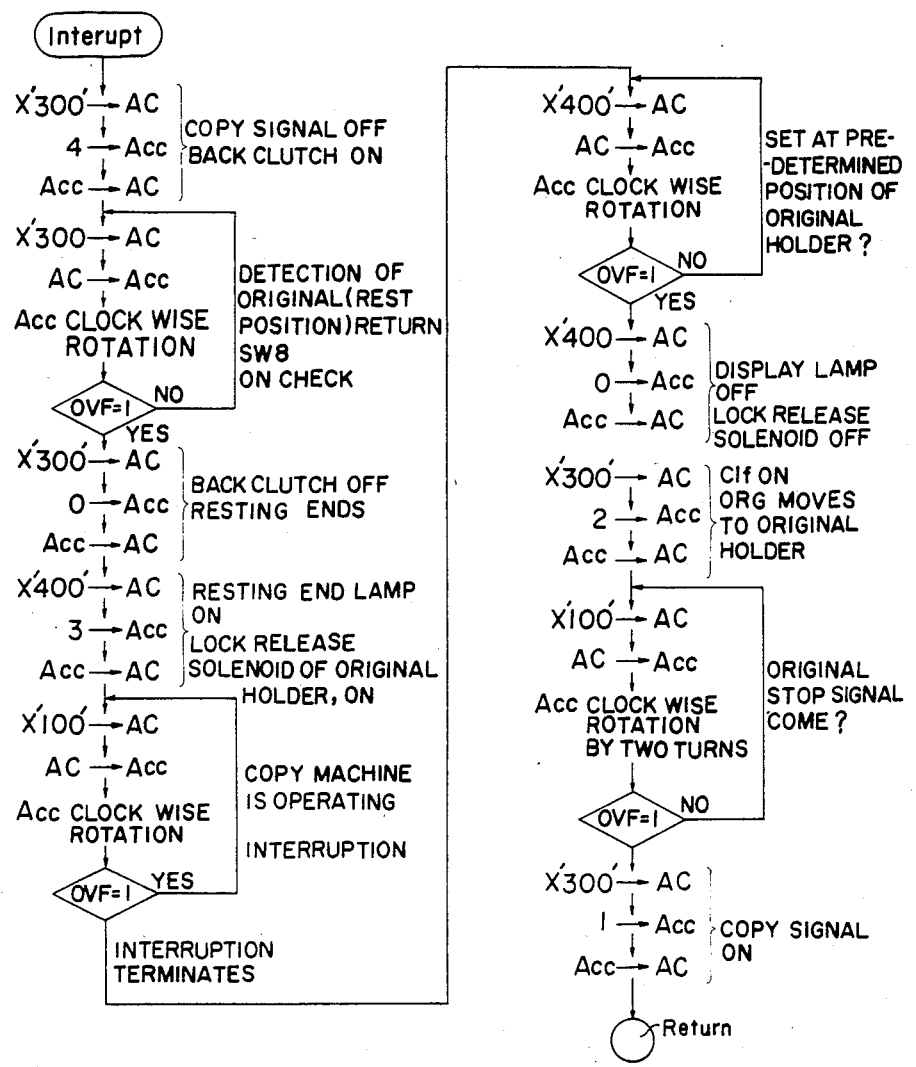

In Fig. 26, "Interupt" should read --Interrupt--.

Col. 1, line 30, change "cevice" to --device--.

Col. 1, lines 67-68, change" an an-other" to another--.

Col. 2, line 34, change "random" to --random-access--.

Col. 3, line 51, change "mounted a" to --mounted on a--.

Col. 4, line 14, change "means for" to --means, for--.

Col. 4, line 20, change "copier" to --copy--.

Col. 4, lines 33-34, change "five in the number in case" to --five in number in the case--.

Col. 4, line 41, change "9 a" to --97, a--.

Col. 4, line 45, delete "wound".

UNITED STATES PATENT AND TRADEMARK OFFICE
CERTIFICATE OF CORRECTION

PATENT NO. : 4,568,177

DATED : February 4, 1986

INVENTOR(S) : TADASHI SATO, ET AL.

It is certified that error appears in the above-identified patent and that said Letters Patent is hereby corrected as shown below:

Col. 4, line 54, change "an another" to --another--.

Col. 5, line 27, change "level 45" to --lever 45--.

Col. 5, line 29, change "128, so" to --$128^1$, so--.

Col. 6, line 42, change "core" to --code--; and change "8-4." to --4-8.--.

Col. 6, lines 50-51, change "a cpntrol circuit for" to --a control circuit CT for--.

Col. 6, line 56, change "toward right" to --toward the right--.

Col. 6, line 67, change "will given" to --will be given--; and change "on" to --of--.

Col. 8, line 22, change "3. 0100" to --3. 0110--.

Col. 8, line 23, change "lead" to --load--.

Col. 8, line 39, change "therefrom" to --therefore--.

Col. 8, line 43, change "Registor D" to --Register D--.

Col. 8, line 63, change "to OV" to --to OVF--.

Col. 9, line 22, change "in" to --is--.

Col. 9, line 24, change "Initially" to --Initially,--.

UNITED STATES PATENT AND TRADEMARK OFFICE
CERTIFICATE OF CORRECTION

PATENT NO. : 4,568,177

DATED : February 4, 1986

INVENTOR(S) : TADASHI SATO, ET AL.

Figure 18:
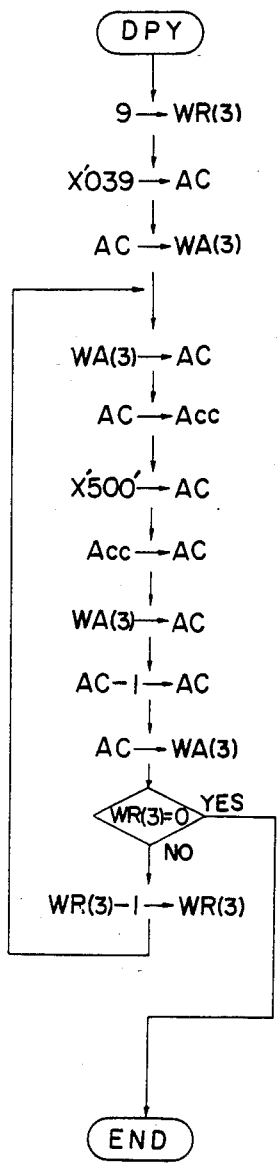

It is certified that error appears in the above-identified patent and that said Letters Patent is hereby corrected as shown below:

Col. 9, line 43, change "FIG. 13," to --FIG. 18,--.

Col. 10, line 26, change "stores" to --store--.

Col. 10, line 54, change "pin 5," to --bin 5,--.

Col. 10, line 63, change "are" to --as--.

Col. 11, line 15, change ""5". if" to --"5". If--.

Col. 11, line 20, change "identifing" to --identifying--.

Col. 12, line 18, change "WE(0)" to --WR(0)--.

Col. 12, line 68, change ""1F?" to --"1F"--.

Col. 13, line 38, change "+X036" to --"X036"--.

Col. 13, line 41, change "ON" to --OK--.

Col. 13, line 43, change "2FOFOFF2OF" to --"2FOFOF2FOF"--.

Col. 15, line 13, change "of above-" to --of the above---.

Col. 15, line 56, change ""X030"-"X030"" to --"X030-X039"--.

Col. 16, line 1, change "detction" to --detection--.

UNITED STATES PATENT AND TRADEMARK OFFICE
CERTIFICATE OF CORRECTION

PATENT NO. : 4,568,177
DATED : February 4, 1986
INVENTOR(S) : TADASHI SATO, ET AL.

It is certified that error appears in the above-identified patent and that said Letters Patent is hereby corrected as shown below:

Col. 16, line 16, change "case of an" to --case an--.

Col. 17, line 68, change "leading" to --loading--.

IN THE ABSTRACT lines 9/10, change "an another" to --another--.

Signed and Sealed this

Seventeenth Day of February, 1987

Attest:

DONALD J. QUIGG

*Attesting Officer*  *Commissioner of Patents and Trademarks*